United States Patent [19]
Takaoka et al.

[11] Patent Number: 5,991,683
[45] Date of Patent: Nov. 23, 1999

[54] POWER OUTPUT APPARATUS AND METHOD OF CONTROLLING THE SAME

[75] Inventors: Toshifumi Takaoka, Anjyo; Takahiro Nishigaki, Susono; Masakiyo Kojima, Susono; Hiroshi Kanai, Susono; Kenichi Nagase, Kariya; Shinichi Abe, Aichi-ken; Yukio Kobayashi, Kasugai; Katsuhiko Yamaguchi; Osamu Harada, both of Toyota, all of Japan

[73] Assignee: Toyota Jidosha Kabushiki Kaisha, Toyota, Japan

[21] Appl. No.: 09/042,188

[22] Filed: Mar. 13, 1998

[30] Foreign Application Priority Data

Mar. 24, 1997 [JP] Japan .................................. 9-90268
Oct. 13, 1997 [JP] Japan .................................. 9-296246

[51] Int. Cl.$^6$ .............................. B60K 6/04; F01B 21/00; F02B 73/00
[52] U.S. Cl. ...................... 701/102; 701/110; 180/65.2; 180/65.6; 60/716; 477/3
[58] Field of Search .................................. 701/53, 54, 60, 701/101, 102, 110, 113; 60/698, 700, 702, 711, 713, 716, 718; 477/3, 5, 8, 13, 14; 180/65.2, 65.6; 290/4 C, 8, 45; 310/102 R; 318/8, 9, 13, 51, 77

[56] References Cited

U.S. PATENT DOCUMENTS

| | | | |
|---|---|---|---|
| 4,148,192 | 4/1979 | Cummings | 60/716 |
| 4,305,254 | 12/1981 | Kawakatsu et al. | 60/716 |
| 4,407,132 | 10/1983 | Kawakatsu et al. | 60/716 |
| 4,566,279 | 1/1986 | Kronogard et al. | 60/718 |
| 5,343,970 | 9/1994 | Severinsky | 60/718 |
| 5,513,719 | 5/1996 | Moroto et al. | 60/718 |
| 5,775,449 | 7/1998 | Moroto et al. | 180/65.2 |
| 5,791,426 | 8/1998 | Yamada et al. | 180/65.2 |
| 5,801,497 | 9/1998 | Shamoto et al. | 477/3 |
| 5,804,934 | 9/1998 | Yamada et al. | 60/698 |
| 5,806,617 | 9/1998 | Yamaguchi | 180/65.2 |
| 5,865,263 | 2/1999 | Yamaguchi et al. | 180/65.2 |
| 5,873,801 | 2/1999 | Taga et al. | 477/5 |
| 5,903,061 | 5/1999 | Tsuzuki et al. | 477/3 |
| 5,914,575 | 6/1999 | Sasaki | 180/65.2 |
| 5,915,489 | 6/1999 | Yamaguchi | 180/65.2 |

FOREIGN PATENT DOCUMENTS

| | | |
|---|---|---|
| 41-24 479 | 1/1993 | Germany . |
| 50-30223 | 3/1975 | Japan . |
| 9-47011 | 2/1997 | Japan . |

Primary Examiner—Willis R. Wolfe
Attorney, Agent, or Firm—Oliff & Berridge, PLC

[57] ABSTRACT

The present invention prevents a decrease in efficiency due to energy circulation in a power transmission path in a power output apparatus having an engine and a motor as power source. In the power output apparatus, a planetary gear 120 has a sun gear shaft linked with a generator MG1, a ring gear shaft linked with a motor MG2, and a planetary carrier linked with an output shaft of an engine 150. The power output apparatus carries out a control procedure to avoid energy circulation, which goes through the planetary gear 120, the motor MG2, and generator MG1, and the planetary gear 120, and thereby prevent a decrease in efficiency. The energy circulation occurs when the motor MG2 converts the power output from the engine 150 to electric power and the generator MG1 carries out power operation with the regenerated electric power. The control procedure monitors a torque command value of the motor MG2 and shifts a driving point of the engine 150 to another driving point of higher revolving speed when the torque command value is not greater than a threshold value Tref.

32 Claims, 26 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically the present invention pertains to a power output apparatus for outputting power to a drive shaft and a method of controlling such a power output apparatus.

2. Description of the Related Art

Known power output apparatuses for carrying out torque conversion of power output from an engine and outputting the converted power to a drive shaft include a combination of a fluid-based torque converter with a transmission. In such a power output apparatus, the torque converter is disposed between an output shaft of the engine and a rotating shaft linked with the transmission, and transmits the power between the rotating shaft and the output shaft through a flow of the sealed fluid. Since the torque converter transmits the power through a flow of the fluid, there is a slip between the output shaft and the rotating shaft, which leads to an energy loss corresponding to the slip. The energy loss is expressed as the product of the revolving speed difference between the rotating shaft and the output shaft and the torque transmitted to the output shaft, and is consumed as heat.

In a vehicle with such a power output apparatus mounted thereon as its power source, at the time when there is a large slip between the rotating shaft and the output shaft, that is, when a significantly large power is required, for example, at the time of starting the vehicle or running the vehicle on an upward slope at a low speed, a large energy loss in the torque converter undesirably lowers the energy efficiency. Even in a stationary driving state, the efficiency of power transmission by the torque converter is not 100%, and the fuel consumption rate in the conventional power output apparatus is thereby lower than that in a manual transmission.

In order to solve such problems, the applicants of the present invention have proposed a system that does not include the fluid-based torque converter but is provided with an engine having an output shaft, a generator having a rotating shaft, a planetary gear including a carrier, a sun gear, and a ring gear respectively linked with the output shaft of the engine, the rotating shaft of the generator, and a drive shaft, and a battery connected to the generator and a motor, and outputs the power from the engine or the electric power stored in the battery to the drive shaft as a desired power (JAPANESE PATENT LAYING-OPEN GAZETTE No. 50-30223).

In the proposed power output apparatus, the power output from the engine that is driven at an arbitrary driving point is divided by means of the planetary gear into power transmitted to the generator and power transmitted to the drive shaft. In case that the power output from the engine is output to the drive shaft as the decreased revolving speed and the increased torque, the power transmitted to the generator is regenerated as electric power, which is used to drive the motor linked with the drive shaft and apply the torque to the drive shaft. In case that the power output from the engine is output to the drive shaft as the increased revolving speed and the decreased torque (that is, in the over-driver mode), on the other hand, the power transmitted to the motor is regenerated as electric power, which is used to drive the generator as a motor. Since the motor is linked with the drive shaft, in the over-drive mode, while the electric power regenerated by the motor is supplied to the generator, part of the power obtained by driving the generator is again regenerated as electric power by the motor before being output to the drive shaft by means of the planetary gear. This causes a circulation path, where part of energy circulates in the sequence of the motor, the generator, the planetary gear, and the motor. An increase in amount of circulated energy decreases the ratio of the energy of smaller loss, which is directly output from the engine to the drive shaft via the planetary gear, and thereby lowers the energy efficiency of the whole power output apparatus.

SUMMARY OF THE INVENTION

One object of the present invention is thus to provide a power output apparatus for outputting power from an engine to a drive shaft at a high efficiency.

In a power output apparatus that converts part of the power output from an engine to a desired power defined by desired torque and revolving speed via the form of electrical energy and outputs the desired power to a drive shaft, another object of the present invention is to prevent a decrease in energy efficiency of the whole power output apparatus due to formation of an energy circulation path in the process of outputting energy from the engine to the drive shaft.

At least part of the above and the other related objects is realized by a first power output apparatus for outputting power to a drive shaft. The first power output apparatus includes: an engine having an output shaft linked therewith; power regulation means connected with the output shaft and the drive shaft for transmitting power output from the engine to the drive shaft and regulating magnitude of the transmitted power through transmission of electric power; a motor linked with the drive shaft for receiving and transmitting power from and to the drive shaft; drive-shaft target power state setting means for setting a revolving speed of the drive shaft and a torque output to the drive shaft as a target power state of the drive shaft; engine target power state setting means for setting a revolving speed of the engine and a torque to be output from the engine as a target power state of the engine, based on the target power state of the drive shaft and a working efficiency of the engine; and control means for controlling the motor and the power regulation means, in order to enable the target power state of the engine to be converted to the target power state of the drive shaft and output to the drive shaft, and driving the engine in a power state that enables an output torque of the motor to be not less than a predetermined torque during the control of the motor and the power regulation means.

In the first power output apparatus of the present invention, the power regulation means connected with the output shaft of the engine and the drive shaft transmits the power output from the engine to the drive shaft and regulates the magnitude of the transmitted power through transmission of electric power. The motor receives and transmits power from and to the drive shaft. The engine target power state setting means sets a revolving speed of the engine and a torque to be output from the engine as a target power state of the engine, based on the target power state of the drive shaft set by the drive-shaft target power state setting means and a working efficiency of the engine. The control means controls the motor and the power regulation means, in order to enable the target power state of the engine to be converted to the target power state of the drive shaft and output to the drive shaft. The control means also controls the engine to the power state that enables the motor to be driven with a torque of not less than a predetermined torque.

The term 'power' herein is expressed by the product of the torque applied to a shaft and the revolving speed of the shaft and implies the magnitude of energy output per unit time. The 'power state' is, on the other hand, a driving state defined by a combination of a torque and a revolving speed that give a certain power. There are a numerous number of combinations of the torque and the revolving speed to define the 'power state' that gives a certain 'power'. The 'power' and the 'power state' have the same meanings in the method of controlling the power output apparatus according to the present invention discussed later. The power output apparatus is controlled, based on the transmission of energy at each moment, that is, based on the energy balance per unit time. The term 'energy' thus implies energy per unit time and is hereinafter used as a synonym of 'power'. In a similar manner, both 'electric power' and 'electrical energy' imply electrical energy per unit time.

In the first power output apparatus of the present invention, the motor is controlled to be driven with a torque of not less than a predetermined torque. Even when energy circulates along a circulation path, which goes through the motor, the power regulating means, and the motor, this structure effectively prevents circulation of energy of not less than a predetermined magnitude. By way of example, when the predetermined torque is equal to zero, this structure prevents any energy circulation. In another example, when the predetermined torque is equal to a specific negative value, this structure prevents circulation of energy of not less than a predetermined magnitude corresponding to the negative value. This results in increasing the ratio of the energy of smaller loss that is directly output from the engine to the drive shaft by mechanical means, thereby improving the energy efficiency of the whole power output apparatus.

In the first power output apparatus of the present invention, the motor and the control means may be replaced respectively by a motor linked with the output shaft for receiving and transmitting power from and to the output shaft and control means for controlling the motor and the power regulation means, in order to enable the target power state of the engine to be converted to the target power state of the drive shaft and output to the drive shaft, and driving the engine in a power state that enables an output torque of the motor to be not greater than a predetermined torque during the control of the motor and the power regulation means.

In this alternative structure with the motor receiving and transmitting power from and to the output shaft, when the motor outputs a positive torque to the output shaft, the motor receives electric power supplied from the power regulation means connected with the output shaft. Part of the power applied to the output shaft by the motor is recovered again as electric power by the power regulation means. In this state, the power output from the engine circulates along a circulation path, which goes through the power regulation means, the motor, and the power regulation means.

In the power output apparatus of this structure, the motor is controlled to be driven with a torque of not greater than a predetermined torque. This structure effectively prevents circulation of energy of not less than a predetermined magnitude. By way of example, when the predetermined torque is equal to zero, this structure prevents any energy circulation. In another example, when the predetermined torque is equal to a specific positive value, this structure prevents circulation of energy of not less than a predetermined magnitude corresponding to the positive value.

The energy circulation occurs according to the difference between the revolving speed of the drive shaft and the revolving speed of the engine, and the allowable range of energy circulation is related to the efficiency of the engine. In the first power output apparatus of the present invention, the predetermined torque may depend upon the revolving speed of the drive shaft or upon the efficiency of the engine.

The first power output apparatus of the present invention with the motor receiving and transmitting power from and to the drive shaft may further include storage battery means electrically connected with the power regulation means and the motor, the storage battery means being capable of being charged with and discharging at least part of the electric power regulated by the power regulation means and at least part of electric power required for the power input and output by the motor. In this structure, the control means includes power control means and engine target power state correcting means. The power control means enables the engine to be driven in the target power state of the engine, regulates the power output from the engine as well as the electric power, which the storage battery means is charged with and which is discharged from the storage battery means, and controls the motor and the power regulation means in order to enable the revolving speed of the drive shaft and the torque output to the drive shaft to coincide with the target power state of the drive shaft. When the motor is driven with a torque of less than the predetermined torque through the control of the power control means, the engine target power state correcting means corrects the target power state of the engine used by the power control means, so as to enable the motor to be driven with a torque of not less than the predetermined torque.

In the power output apparatus of this structure, the storage battery means is charged with or discharges at least part of the electric power regulated by the power regulation means and at least part of electric power required for the power input and output by the motor according to the requirements. The power control means included in the control means controls the engine to the target power state of the engine. The power control means also regulates the power output from the engine and the electric power, which the storage battery means is charged with or which is discharged from the storage battery means, and controls the motor and the power regulation means so as to enable the power output to the drive shaft to coincide with the target power state of the drive shaft. When the motor is driven with a torque of less than the predetermined torque through the control of the power control means, the engine target power state correcting means included in the control means corrects the target power state of the engine used by the power control means, so as to enable the motor to be driven with a torque of not less than the predetermined torque. In the power output apparatus of this structure, the correction of the target power state of the engine allows the motor to be driven with a torque of not less than the predetermined torque.

In the power output apparatus of this structure, the engine target power state correcting means may correct the target power state of the engine to a power state having an identical power but a greater revolving speed. This structure prevents energy circulation without varying the energy output from the engine.

In this power output apparatus, the motor and the engine target power state correcting means may be replaced respectively by a motor linked with the output shaft for receiving and transmitting power from and to the output shaft and engine target power state correcting means for, when the motor is driven with a torque of greater than the predetermined torque through the control of the power control means, correcting the target power state of the engine used by the power control means, so as to enable the motor to be driven with a torque of not greater than the predetermined torque.

In this structure, the engine target power state correcting means may correct the target power state of the engine to a power state having an identical power but a less revolving speed.

In accordance with one preferable application, the power output apparatus, in which the target power state of the engine is corrected to a power state of an identical power but a greater revolving speed, further includes shift control means for, when the engine target power state correcting means corrects the target power state of the engine, controlling the engine, the motor, and the power regulation means, in order to enable a driving state of the engine to approach the corrected target power state of the engine, while keeping the power output from the engine substantially unchanged. This structure enables the power output from the engine to be kept constant even in the transient state.

In the power output apparatus of this application, the engine may be an internal combustion engine having an air intake conduit and an air intake valve and include opening area variation means for varying an opening area of the air intake conduit and open-close timing change means for changing an open-close timing of the air intake valve. The shift control means gradually changes the open-close timing of the air intake valve and the electric power regulated by the power regulation means, while keeping the opening area of the air intake conduit at a predetermined value, so as to enable the driving state of the engine to approach the corrected target power state of the engine.

In accordance with another preferable application, the power output apparatus, in which the target power state of the engine is corrected to a power state of an identical power but a greater revolving speed, further includes shift control means for, when the engine target power state correcting means corrects the target power state of the engine, controlling the engine, the motor, and the power regulation means, in order to enable a driving state of the engine to approach the corrected target power state of the engine by giving a preference to the revolving speed over the torque. This structure changes the revolving speed prior to the torque and thereby carries out the multi-step control.

In the power output apparatus of this application, the engine may be an internal combustion engine having an air intake conduit and include an opening area variation means for varying an opening area of the air intake conduit. In this structure, the shift control means includes: revolving speed shifting means for varying the electric power regulated by the power regulation means, so as to enable the revolving speed of the engine to approach a revolving speed corresponding to the corrected target power state of the engine; and torque shifting means for regulating the opening area of the air intake conduit, so as to enable the engine to output a torque corresponding to the corrected target power state of the engine, in response to the shift of the revolving speed of the engine by the revolving speed shifting means.

Alternatively the engine may be an internal combustion engine having an air intake conduit and an air intake valve and include open-close timing change means for changing an open-close timing of the air intake valve. In this alternative structure, the shift control means includes: revolving speed shifting means for varying the electric power regulated by the power regulation means, so as to enable the revolving speed of the engine to approach a revolving speed corresponding to the corrected target power state of the engine; and torque shifting means for regulating the open-close timing of the air intake valve, so as to enable the engine to output a torque corresponding to the corrected target power state of the engine, in response to the shift of the revolving speed of the engine by the revolving speed shifting means.

The shift control means of various structures discussed above may be applied to the power output apparatus with the motor receiving and transmitting power from and to the output shaft.

At least part of the objects of the present invention is also realized by a second power output apparatus for outputting power to a drive shaft. The second power output apparatus includes: an engine having an output shaft linked therewith; power regulation means connected with the output shaft and the drive shaft for transmitting power output from the engine to the drive shaft and regulating magnitude of the transmitted power through transmission of electric power; a motor linked with the drive shaft for receiving and transmitting power from and to the drive shaft; drive-shaft target power state setting means for setting a revolving speed of the drive shaft and a torque output to the drive shaft as a target power state of the drive shaft; memory means for storing a relationship between the revolving speed of the drive shaft, the power output from the engine, and a power state of the engine that enables the motor to be driven with a torque of not less than a predetermined torque; revolving speed input means for inputting the revolving speed of the drive shaft; engine target power state setting means for setting the power state of the engine obtained by referring to the relationship stored in the memory means as a target power state of the engine, based on a power to be output from the engine, which is set based on the target power state of the drive shaft, and the input revolving speed of the drive shaft; and control means for controlling the engine to be driven in the target power state of the engine, and controlling the motor and the power regulation means, so as to enable the power state of the engine to be converted to the target power state of the drive shaft and output to the drive shaft.

The second power output apparatus of the present invention sets the power state that enables the motor to be driven with a torque of not less than a predetermined torque as the target power state of the engine by referring to the relationship stored in the memory means. This structure causes the motor to be driven with a torque of not less than the predetermined torque and thus effectively prevents energy circulation. Another advantage of this structure is to readily realize the control for preventing such energy circulation. The second power output apparatus carries out the control based on the revolving speed of the drive shaft, which varies more gently than the torque of the motor, thereby enabling the driving state of the power output apparatus to be changed smoothly.

In the second power output apparatus, the motor and the memory means may be replaced respectively by a motor linked with the output shaft for receiving and transmitting power from and to the output shaft and memory means for storing a relationship between the revolving speed of the drive shaft, the power output from the engine, and a power state of the engine that enables the motor to be driven with a torque of not greater than a predetermined torque.

In the second power output apparatus, the predetermined torque may be equal to zero or depend upon the revolving speed of the drive shaft or upon the efficiency of the engine.

Any one of the power output apparatuses with the storage battery means may further include: target electric power setting means for setting a target electric power, which the storage battery means is charged with and which is discharged from the storage battery means; and an auxiliary machine driven by the power output from the engine as a power source. In this structure, the engine target power state setting means sets the target power state of the engine, based on the target power state of the drive shaft, the target electric power, and power required for driving the auxiliary machine. The predetermined torque depends upon the target electric power and the power required for driving the auxiliary machine.

In either the first power output apparatus or the second power output apparatus of the present invention, the power regulation means may include: three shaft-type power input/output means having a first rotating shaft connected with the output shaft, a second rotating shaft connected with the drive shaft, and a third rotating shaft which are different from the first rotating shaft and the second rotating shaft, the three shaft-type power input/output means determining a power state of a residual one rotating shaft, based on predetermined power state of any two rotating shafts among the three rotating shafts; and a second motor linked with the third rotating shaft for receiving and transmitting power from and to the third rotating shaft.

The present invention is also directed to a fist method of controlling a power output apparatus for outputting power to a drive shaft, which includes: an engine having an output shaft; power regulation means connected with the output shaft of the engine and the drive shaft for transmitting power output from the engine to the drive shaft and regulating magnitude of the transmitted power through transmission of electric power; and a motor for receiving and transmitting power from and to the drive shaft. The fist method includes the steps of:

(a) setting a revolving speed of the drive shaft and a torque output to the drive shaft as a target power state of the drive shaft;

(b) setting a revolving speed of the engine and a torque to be output from the engine as a target power state of the engine, based on the target power state of the drive shaft and a working efficiency of the engine; and (c) controlling the motor and the power regulation means, in order to enable the target power state of the engine to be converted to the target power state of the drive shaft and output to the drive shaft, and driving the engine in a power state that enables an output torque of the motor to be not less than a predetermined torque during the control of the motor and the power regulation means.

In the first method of the present invention, the motor is controlled to be driven with a torque of not less than a predetermined torque. Even when energy circulates along a circulation path, which goes through the motor, the power regulating means, and the motor, this structure effectively prevents circulation of energy of not less than a predetermined magnitude. By way of example, when the predetermined torque is equal to zero, this structure prevents any energy circulation. In another example, when the predetermined torque is equal to a specific negative value, this structure prevents circulation of energy of not less than a predetermined magnitude corresponding to the negative value. This results in increasing the ratio of the energy of smaller loss that is directly output from the engine to the drive shaft by mechanical means, thereby improving the energy efficiency of the whole power output apparatus. The energy circulation occurs according to the difference between the revolving speed of the drive shaft and the revolving speed of the engine, and the allowable range of energy circulation is related to the efficiency of the engine. In the first method of the present invention, the predetermined torque may depend upon the revolving speed of the drive shaft or upon the efficiency of the engine.

In the first method of the present invention, the power output apparatus may further include storage battery means being capable of being charged with and discharging at least part of the electric power regulated by the power regulation means and at least part of electric power required for the power input and output by the motor. In this case, the step (c) includes the steps of:

(c1) enabling the engine to be driven in the target power state of the engine, converting the power output from the engine as well as the electric power, which the storage battery means is charged with and which is discharged from the storage battery means, and controlling the motor and the power regulation means in order to enable the power output to the drive shaft to coincide with the target power state of the drive shaft, (c2) when the motor is driven with a torque of less than the predetermined torque through the control of the step (c1), correcting the target power state of the engine used in the step (c1), so as to enable the motor to be driven with a torque of not less than the predetermined torque.

The present invention is further directed to a second method of controlling a power output apparatus for outputting power to a drive shaft, which includes: an engine having an output shaft; power regulation means connected with the output shaft of the engine and the drive shaft for transmitting power output from the engine to the drive shaft and regulating magnitude of the transmitted power through transmission of electric power; a motor for receiving and transmitting power from and to the drive shaft; and memory means for storing a relationship between the revolving speed of the drive shaft, the power output from the engine, and a power state of the engine that enables the motor to be driven with a torque of not less than a predetermined torque. The second method includes the steps of:

(a) setting a revolving speed of the drive shaft and a torque output to the drive shaft as a target power state of the drive shaft;

(b) setting the power state of the engine obtained by referring to the relationship stored in the memory means as a target power state of the engine, based on a power to be output from the engine, which is set based on the target power state of the drive shaft, and an input revolving speed of the drive shaft; and (c) controlling the engine to be driven in the target power state of the engine, and controlling the motor and the power regulation means, so as to enable the power state of the engine to be converted to the target power state of the drive shaft and output to the drive shaft.

The second method of the present invention corrects the target power state of the engine, so as to enable the motor to be driven with a torque of not less than a predetermined torque.

Either the first method or the second method of the present invention may be applied to the power output apparatus, which has a motor receiving and transmitting power from and to the output shaft, instead of the motor receiving and transmitting power from and to the drive shaft. In this case, the control is carried out to enable the motor to be driven with a torque of not greater than a predetermined torque.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
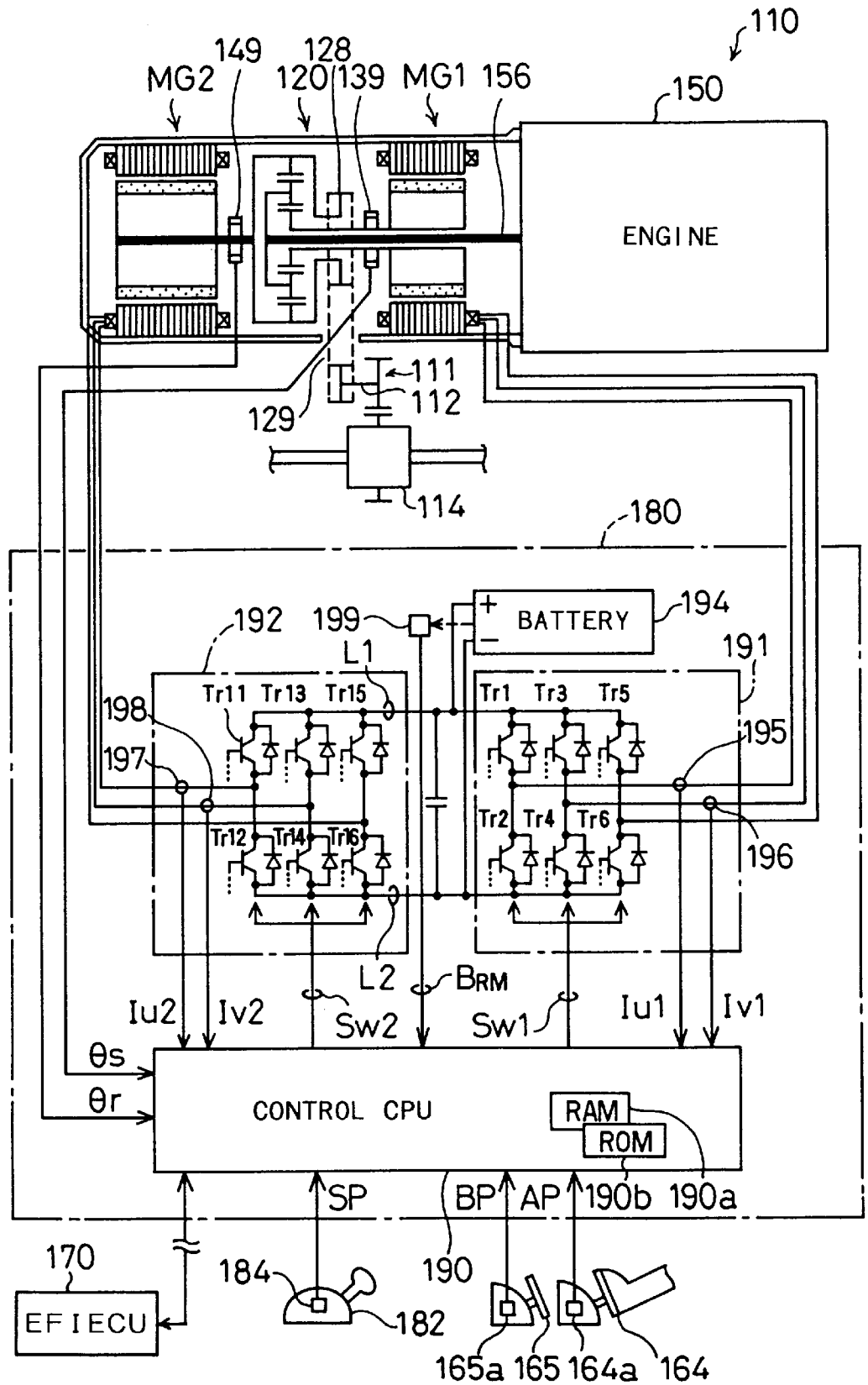
FIG. 1 schematically illustrates structure of a power output apparatus 110 embodying the present invention.
Figure 2:
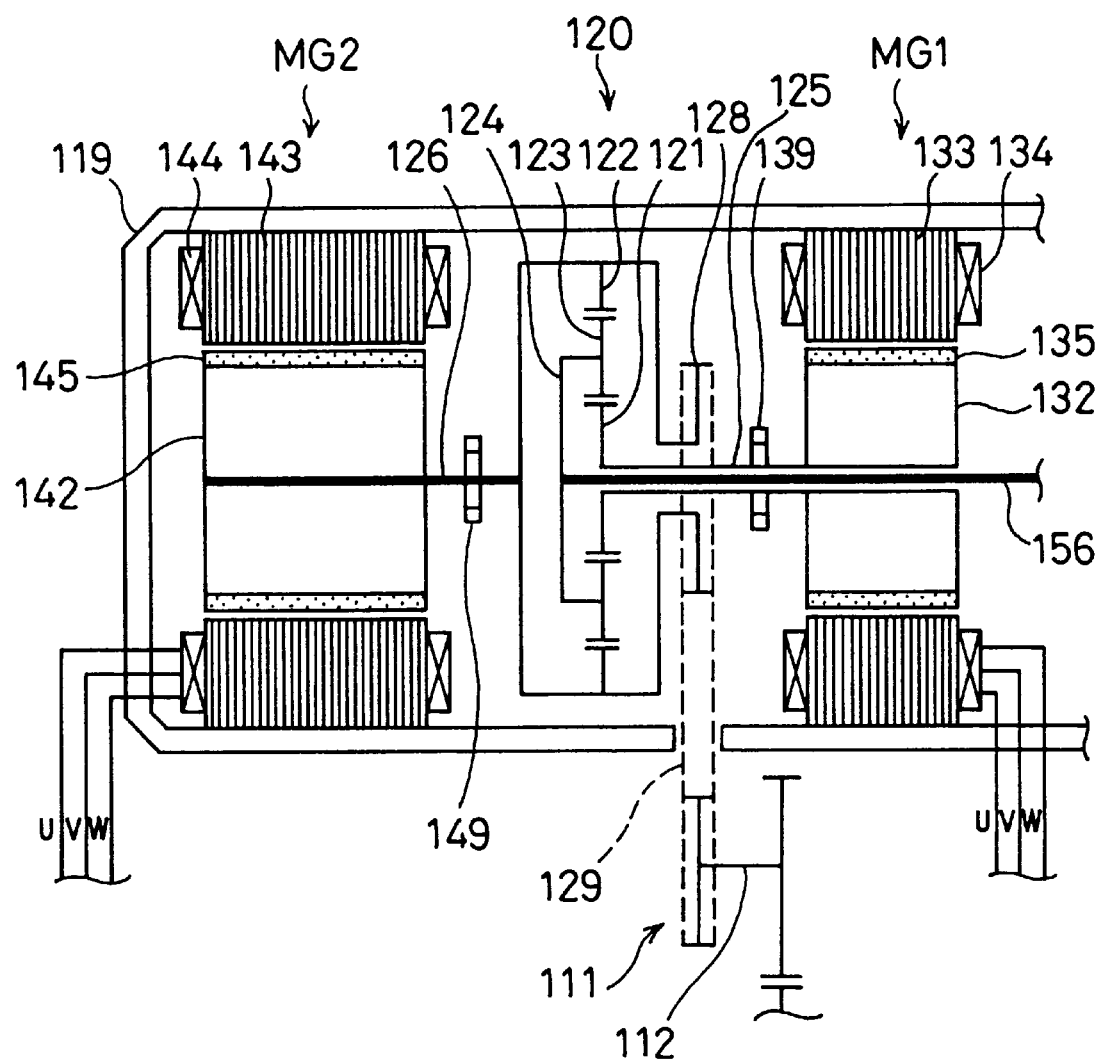
FIG. 2 is an enlarged view illustrating an essential part of the power output apparatus 110 of the embodiment.
Figure 3:
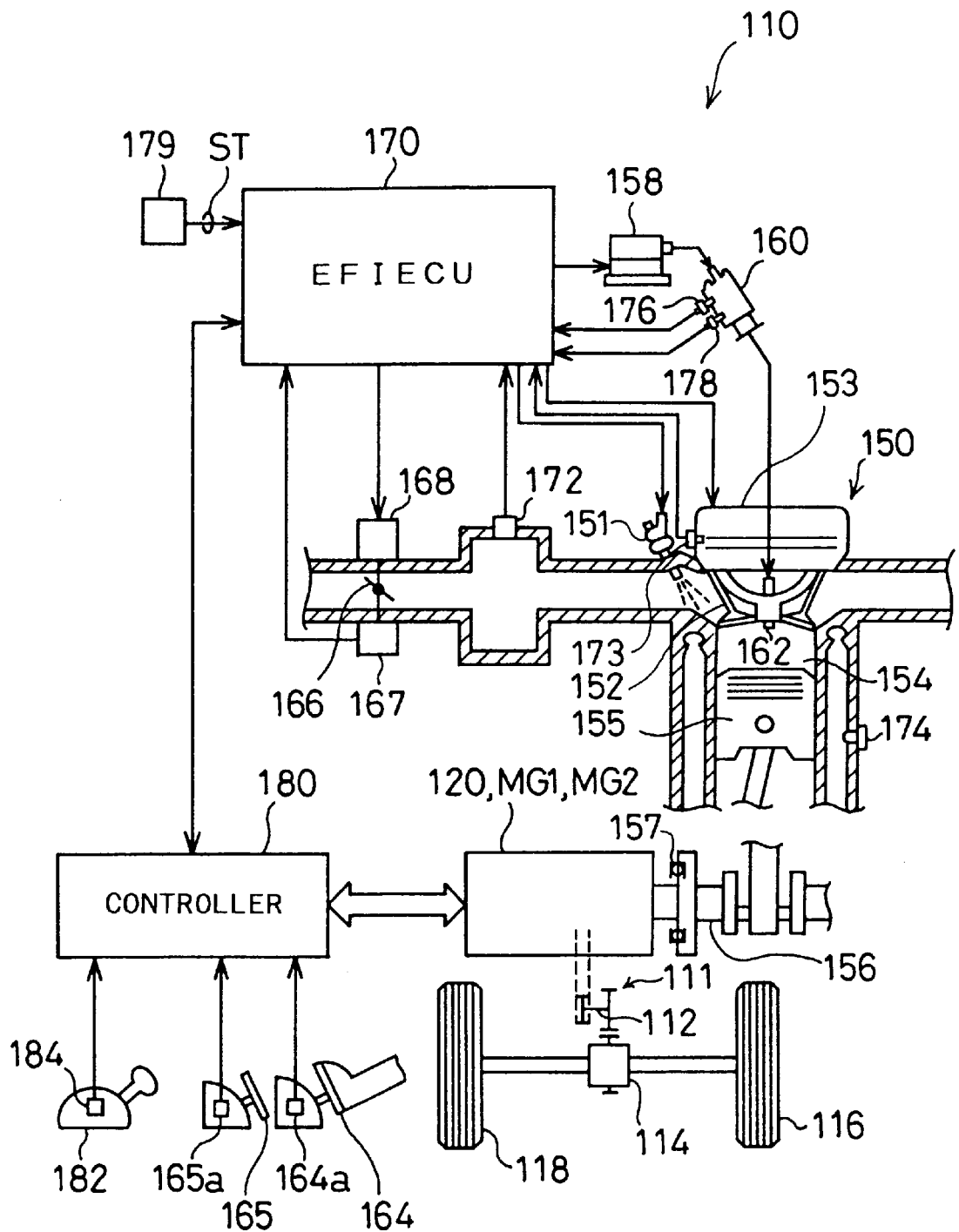
FIG. 3 schematically illustrates general structure of a vehicle with the power output apparatus 110 of the embodiment incorporated therein.

Some modes of carrying out the present invention are discussed below as preferred embodiments. FIG. 1 schematically illustrates structure of a power output apparatus 110 embodying the present invention, FIG. 2 is an enlarged view illustrating an essential part of the power output apparatus 110 of the embodiment, and FIG. 3 schematically illustrates general structure of a vehicle with the power output apparatus 110 of the embodiment incorporated therein. The general structure of the vehicle is described first for the convenience of explanation.

Referring to FIG. 3, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 154 via an air intake valve 152 to be explosively ignited and burned. Linear motion of a piston 155 pressed down by the explosion of the air/fuel mixture is converted to rotational motion of a crankshaft 156. The throttle valve 166 is driven to open and close by an actuator 168. An ignition plug 162 converts a high voltage applied from an igniter 158 via a distributor 160 to a spark, which explosively ignites and combusts the air/fuel mixture.

The engine 150 includes an open-close timing change mechanism 153 for varying an open-close timing BT of the air intake valve 152. The open-close timing change mechanism 153 leads or lags the phase of an intake cam shaft (not shown) for opening and closing the air intake valve 152 relative to the crank angle, thereby regulating the open-close timing BT of the air intake valve 152. An electronic control unit 170 (described below) caries out a feedback control based on a signal output from a cam shaft position sensor 173 that measures the position of the intake cam shaft, and determines the lead and the lag of the phase of the intake cam shaft.

Operation of the engine 150 is controlled by the electronic control unit (hereinafter referred to as EFIECU) 170. The EFIECU 170 receives information from various sensors, which detect operating conditions of the engine 150. These sensors include a throttle valve position sensor 167 for detecting a valve travel or position TVP of the throttle valve 166, a manifold vacuum sensor 172 for measuring a load applied to the engine 150, the cam shaft position sensor 173 for measuring the position of the intake cam shaft, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is linked with a planetary gear 120 and first and second motors MG1 and MG2 (described later). The crankshaft 156 is further connected to a differential gear 114 via a power transmission gear 111, which has a drive shaft 112 as a rotating axis. The power output from the power output apparatus 110 is thus eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164a attached to an accelerator pedal 164, and a brake pedal position sensor 165a attached to a brake pedal 165, as described later in detail. The controller 180 sends and receives a variety of data and information to and from the EFIECU 170 through communication. Details of the control procedure including a communication protocol will be described later.

Referring to FIGS. 1 and 2, the power output apparatus 110 of the embodiment primarily includes the engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

The following describes structure of the planetary gear 120 and the first and the second motors MG1 and MG2 based on the drawing of FIG. 2. The planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the power input to and output from the residual one shaft. The details of the input and output operations of the power into and from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle θs.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

The controller 180 for driving and controlling the first and the second motor MG1 and MG2 has the following configuration. Referring back to FIG. 1, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190a used as a working memory, a ROM 190b in which various control programs are stored, an input/output port (not shown), and a serial communication port (not shown) through which data are sent to and received from the EFIECU 170. The control CPU 190 receives a variety of data via the input port. The input data include a rotational angle θs of the sun gear shaft 125 measured with the resolver 139, a rotational angle θr of the ring gear shaft 126 measured with the resolver 149, an accelerator pedal position AP (step-on amount of the accelerator pedal 164) output from the accelerator position sensor 164a, a brake pedal position BP (step-on amount of the brake pedal 165) output from the brake pedal position sensor 165a, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 911. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr11 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 191. The second control signal SW2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

Figure 4:
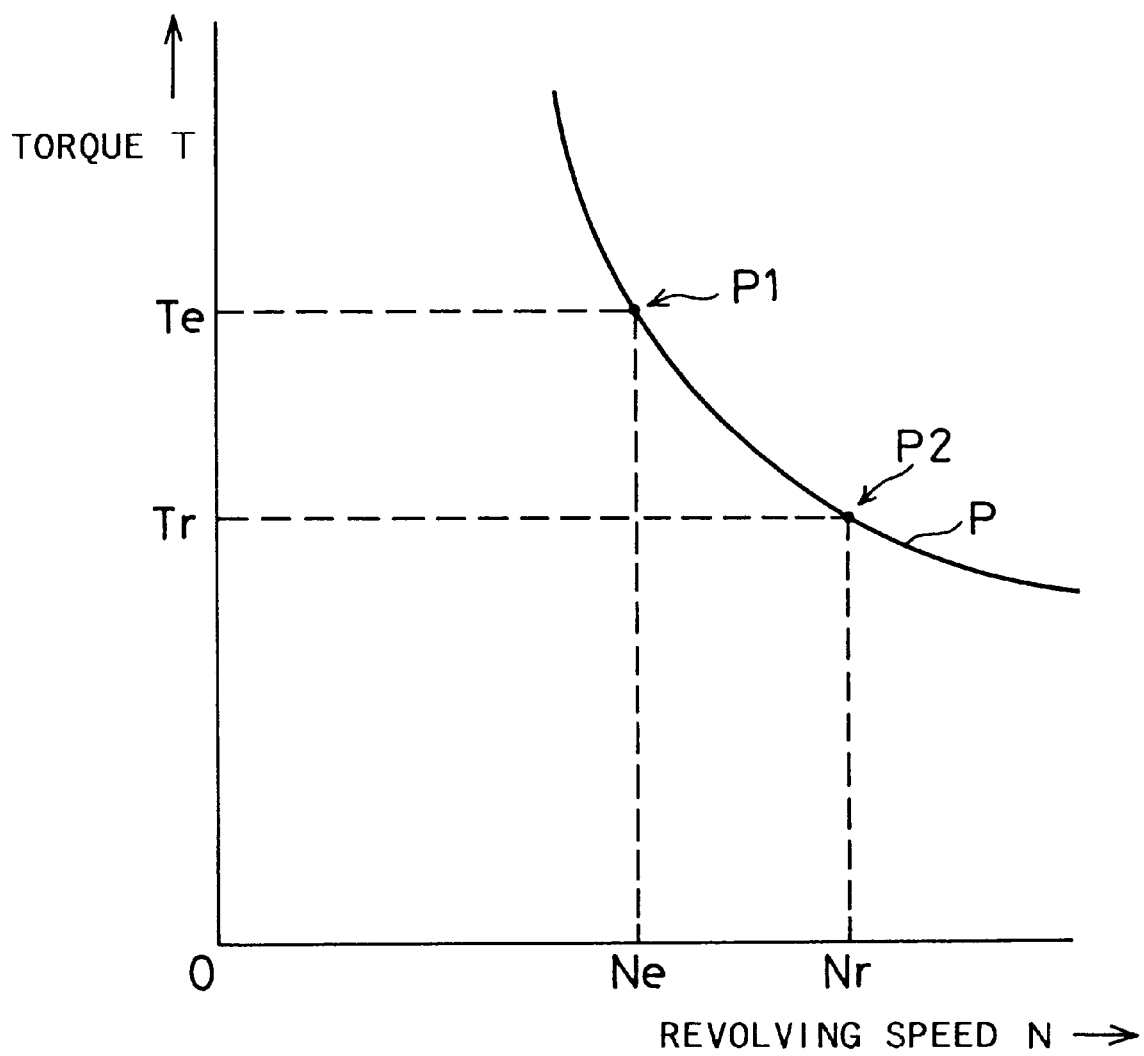
FIG. 4 is a graph showing the operation principle of the power output apparatus 110 of the embodiment.

The power output apparatus 110 of the embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

Figure 5:
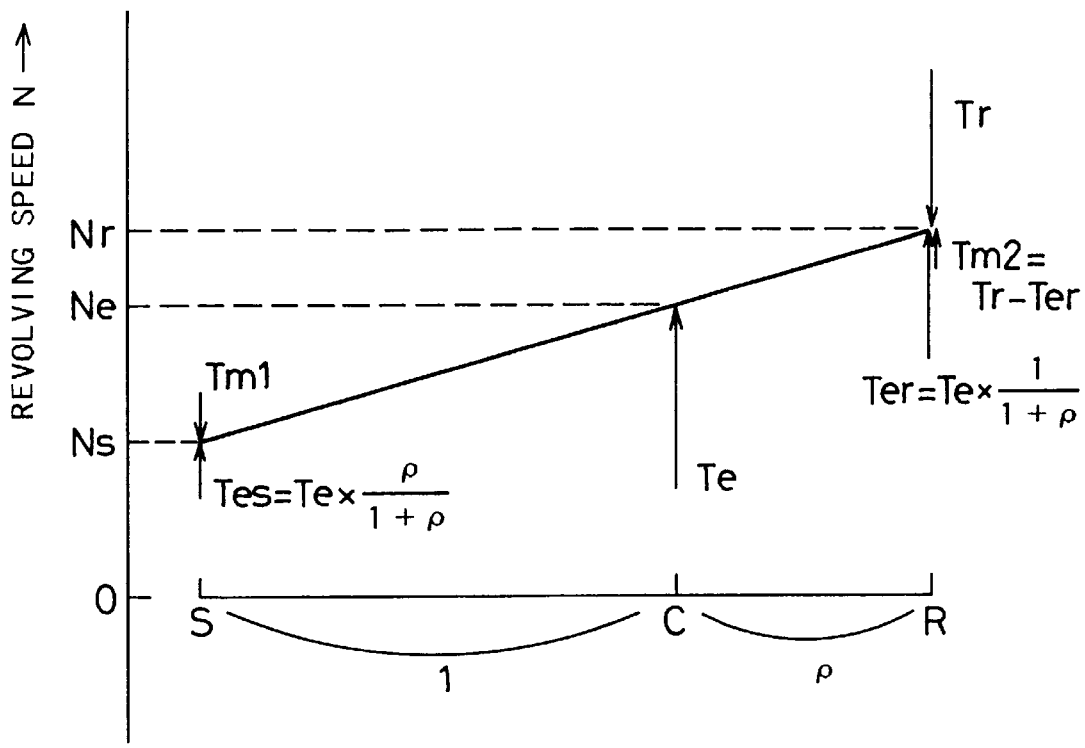
FIG. 5 is a nomogram showing the relationship between the revolving speed and the torque on the three shafts linked with the planetary gear 120 in the power output apparatus 110 of the embodiment.
Figure 6:
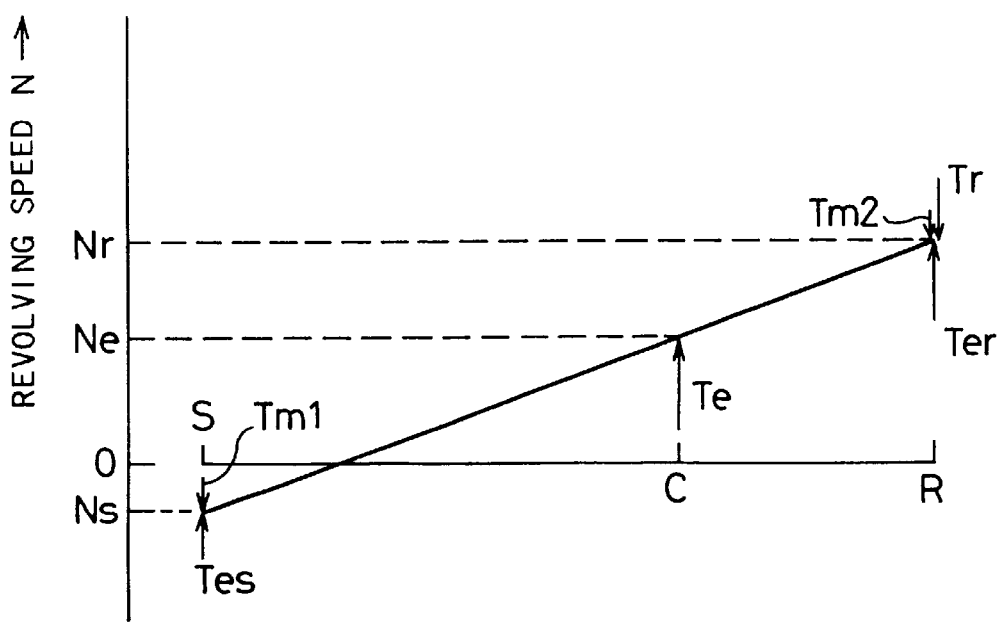
FIG. 6 is a nomogram showing the relationship between the revolving speed and the torque on the three shafts linked with the planetary gear 120 in the power output apparatus 110 of the embodiment.

According to the mechanics, the relationship between the revolving speed and the torque of the three shafts in the planetary gear 120 (that is, the sun gear shaft 125, the ring gear shaft 126, and the planetary carrier 124 (crankshaft 156)) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the nomogram of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents a ratio of the number of teeth of the sun gear 121 to the number of teeth of the ring gear 122 and expressed as Equation (1) given below:

$$\rho = \frac{\text{the number of teeth of the sun gear 121}}{\text{the number of teeth of the ring gear 122}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)1 + \frac{\rho}{\rho} \quad (2)$$

The torque Te of the engine 150 is then applied (upward in the drawing) to the dynamic collinear line on the coordinate axis C of the planetary carrier 124 functioning as a line of action. The dynamic collinear line against the torque can be regarded as a rigid body to which a force is applied as a vector. Based on the technique of dividing the force into two different parallel lines of action, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \qquad (3)$$

$$Ter = Te \times \frac{1}{1+\rho} \qquad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy Pm2, which is given as the product of the torque Tm2 and the revolving speed Nr, as a power to the ring gear shaft 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power state that is expressed as the product of the torque Te and the revolving speed Ne and output from the engine 150 driven at the driving point P1 is subjected to torque conversion and output to the ring gear shaft 126 as the power state of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Figure 7:
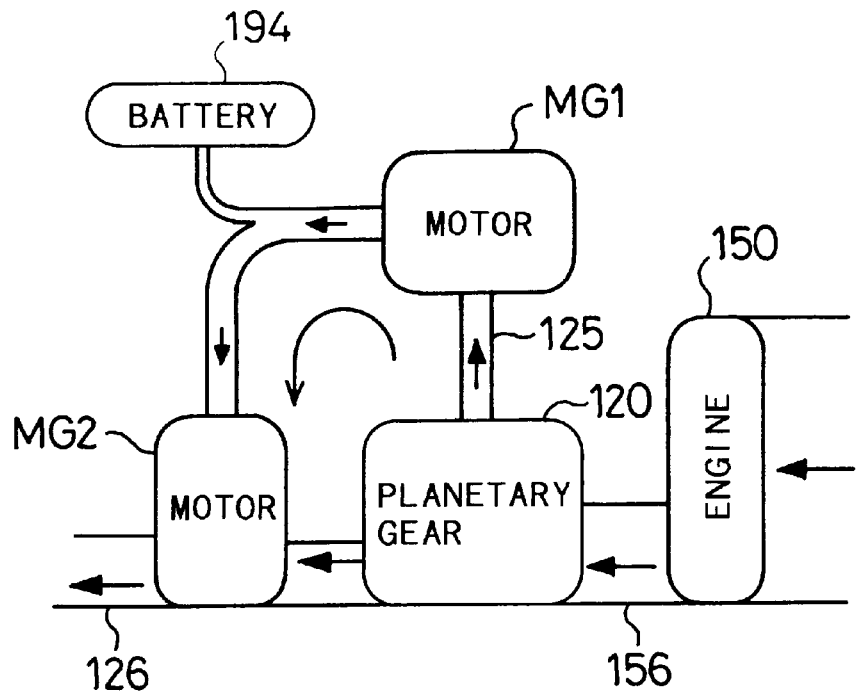
FIG. 7 schematically illustrates an energy flow when the power output apparatus 110 of the embodiment is in the driving state shown in the nomogram of FIG. 5.

FIG. 7 schematically shows an energy flow in the state of the nomogram of FIG. 5. In the drawing of FIG. 7, the thickness of each energy path represents the magnitude of energy. The engine 150 converts the chemical energy of a fuel (more specifically, the chemical energy of gasoline in this embodiment) into mechanical energy (power of revolutions) at a specific efficiency and outputs the mechanical energy to the crankshaft 156. The planetary gear 120 receives the mechanical energy output from the engine 150 via its planetary carrier 124, and divides the input mechanical energy into the sun gear shaft 125 and the ring gear shaft 126 based on the equilibrium of forces on the dynamic collinear line discussed above. The first motor MG1 attached to the sun gear shaft 125 functions as a generator and converts the division of the mechanical energy given by the planetary gear 120 to the sun gear shaft 125 to electrical energy Pm1 at a specific efficiency and supplies the regenerated electrical energy Pm1 to the battery 194 and the second motor MG2. The second motor MG2 attached to the ring gear shaft 126 converts the electrical energy Pm1 supplied from the first motor MG1 to mechanical energy at a specific efficiency and outputs the mechanical energy to the ring gear shaft 126, which also receives the division of mechanical energy given by the planetary gear 120. It is here assumed that all the electrical energy Pm1 regenerated by the first motor MG1 is supplied to the second motor MG2 without causing charge or discharge of the battery 194. The mechanical energy output from the engine 150 to the crankshaft 156 then passes through two pathways and is eventually output to the ring gear shaft 126. The first pathway goes through the planetary gear 120 and directly outputs the mechanical energy to the ring gear shaft 126. The second pathway goes through the first motor MG1 and the second motor MG2 to convert the mechanical energy to electrical energy and reconvert the electrical energy to mechanical energy, prior to the output to the ring gear shaft 126. When the power output apparatus 110 of the embodiment is in the state of the nomogram of FIG. 5, the power output from the engine 150 is subjected to torque conversion to a desired power state via these two pathways and eventually output to the ring gear shaft 126. In the schematic diagram of FIG. 7, the battery 194 is charged with part of the electrical energy Pm1 regenerated by the first motor MG1. Another possible process takes electrical energy out of the battery 194 and supplies the sum of the electrical energy from the battery 194 and the electrical energy Pm1 regenerated by the first motor MG1 to the second motor MG2.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the fist motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

Figure 8:
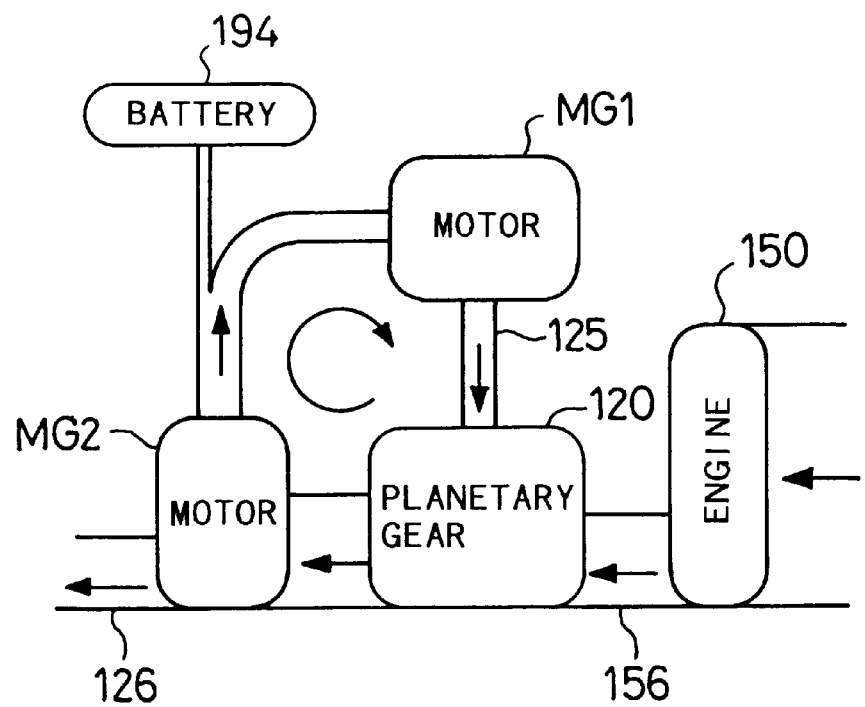
FIG. 8 schematically illustrates an energy flow when the power output apparatus 110 of the embodiment is in the driving state shown in the nomogram of FIG. 6.
Figure 9:
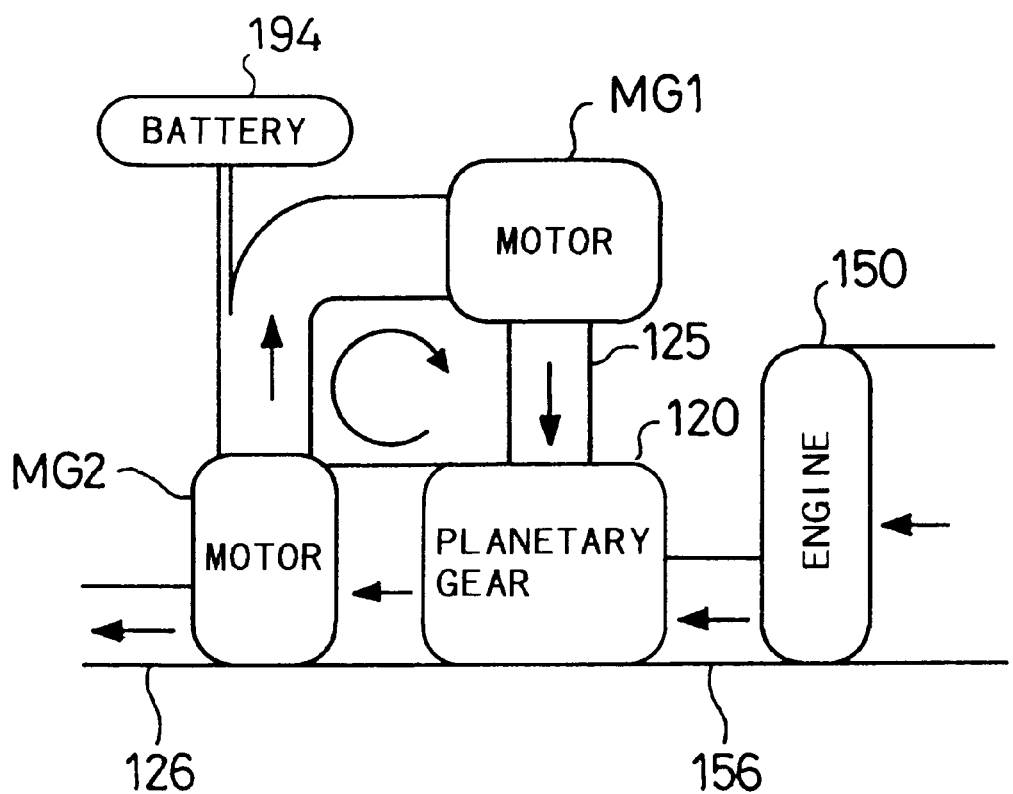
FIG. 9 schematically illustrates an energy flow when a large energy circulation occurs.

FIG. 8 schematically shows an energy flow in the state of the nomogram of FIG. 6. The planetary gear 120 receives the mechanical energy output from the engine 150 via its planetary carrier 124 as well as the mechanical energy output from the first motor MG1 via the sun gear shaft 125, and outputs the total mechanical energy to the ring gear shaft 126 based on the equilibrium of forces on the dynamic collinear line discussed above. The second motor MG2 attached to the ring gear shaft 126 functions as a generator and converts a division of the mechanical energy given by the planetary gear 120 to the ring gear shaft 126 to electrical energy Pm2 at a specific efficiency and supplies the regenerated electrical energy Pm2 to the battery 194 and the first motor MG1. It is here assumed that all the electrical energy Pm2 regenerated by the second motor MG2 is supplied to the first motor MG1 without causing charge or discharge of the battery 194. The mechanical energy output from the engine 150 to the crankshaft 156 then goes through a circulation path, which consists of the first motor MG1, the planetary gear 120, the second motor MG2, and again the first motor MG1, and is eventually output to the ring gear shaft 126. When the power output apparatus 110 of the embodiment is in the state of the nomogram of FIG. 6, the power output from the engine 150 is subjected to torque conversion to a desired power state via this circulation path of energy and eventually output to the ring gear shaft 126. In case that either the revolving speed Nr of the ring gear shaft 126 or the torque Te of the engine 150 is significantly increased in the state of the nomogram of FIG. 6, the circulating energy is enhanced as shown in the schematic diagram of FIG. 9. The increased circulating energy causes an increased loss by the first motor MG1 and the second motor MG2 and decreases the ratio of the mechanical energy of smaller loss that is directly output to the ring gear shaft 126 via the planetary gear 120 to the total mechanical energy output from the engine 150, thereby lowering the energy efficiency of the power output apparatus 110. The circulation of large energy is undesirable from the viewpoint of energy efficiency as discussed previously. In the schematic diagrams of FIGS. 8 and 9, the battery 194 is charged with part of the electrical energy Pm2 regenerated by the second motor MG2. Another possible process takes electrical energy out of the battery 194 and supplies the sum of the electrical energy from the battery 194 and the electrical energy Pm2 regenerated by the second motor MG2 to the first motor MG1.

Figure 10:
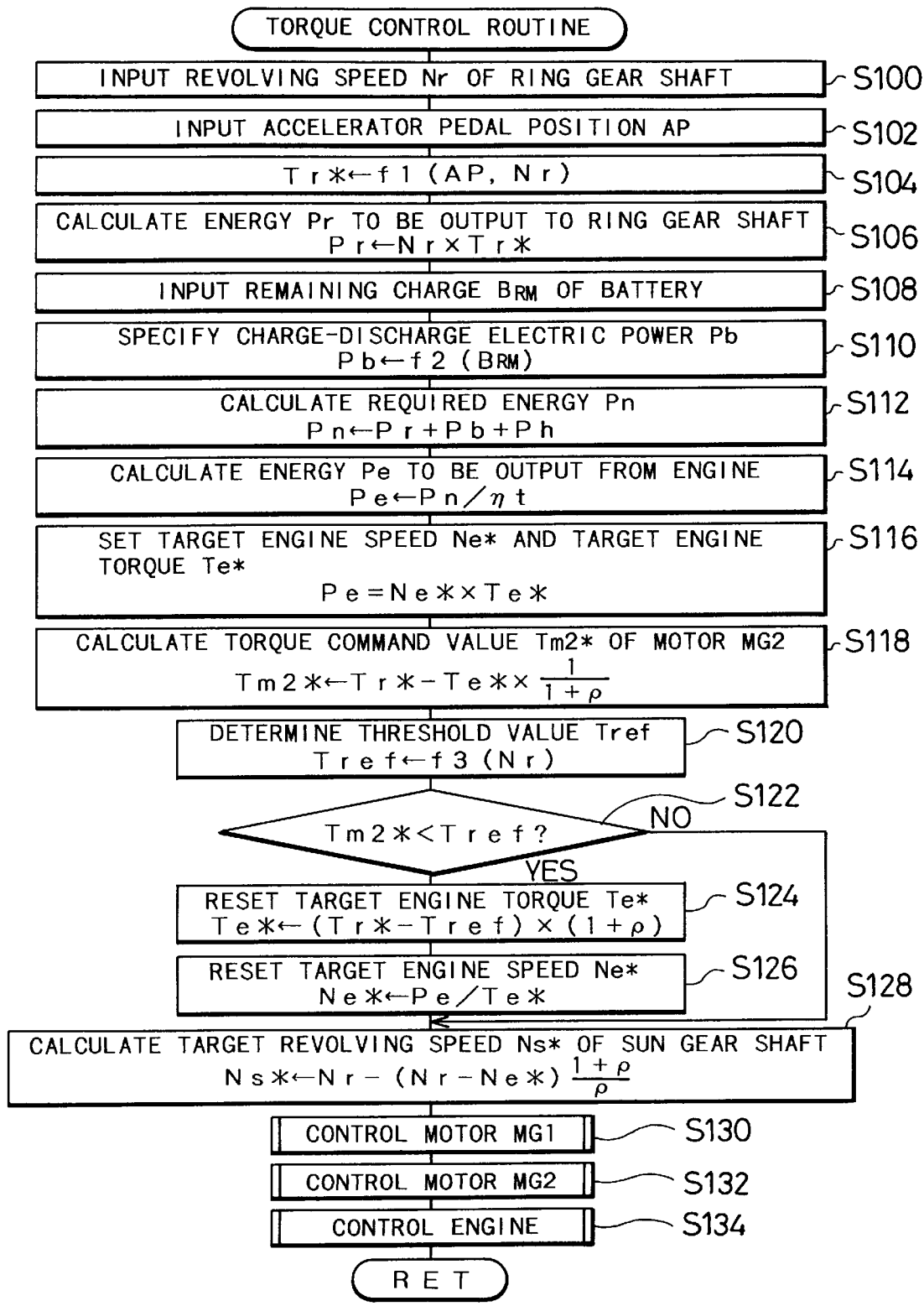
FIG. 10 is a flowchart showing a torque control routine carried out by the controller 180 of the embodiment.

FIG. 10 is a flowchart showing a torque control routine carried out to prevent the circulation of large energy. This routine is repeatedly executed at predetermined time intervals (for example, at every 48 msec) after the power output apparatus 110 is activated. When the program enters the routine of FIG. 10, the control CPU 190 of the controller 180 first reads the revolving speed Nr of the ring gear shaft 126 at step S100. The revolving speed Nr of the ring gear shaft 126 may be calculated from the rotational angle θr of the ring gear shaft 126 detected by the resolver 149.

Figure 11:
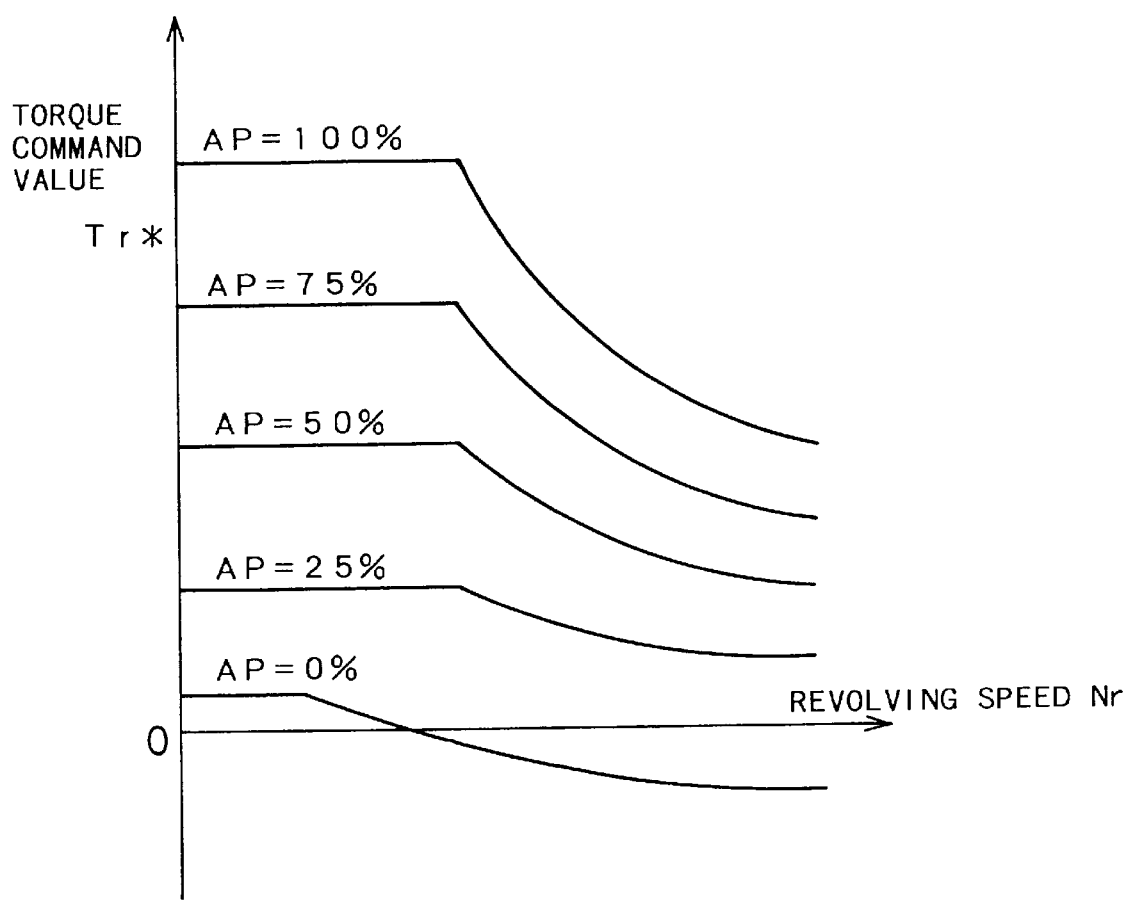
FIG. 11 is a graph showing the relationship between the revolving speed Nr of the ring gear shaft 126, the accelerator pedal position AP, and the torque command value Tr*.

The control CPU 190 then reads the accelerator pedal position AP detected by the accelerator position sensor 164a at step S102. The driver steps on the accelerator pedal 164 when feeling insufficiency of the output torque. The value of the accelerator pedal position AP accordingly represents the output torque which the driver requires (that is, the torque to be output to the driving wheels 116 and 118). The control CPU 190 determines a torque command value Tr* or a target torque to be output to the ring gear shaft 126 based on the input accelerator pedal position AP and the revolving speed Nr of the ring gear shaft 126 at step S104, and calculates energy Pr to be output to the ring gear shaft 126 from the torque command value Tr* and the input revolving speed Nr of the ring gear shaft 126 (Pr=Tr*×Nr) at step S106. The procedure does not specify the torque to be output to the driving wheels 116 and 118 but determines the torque to be output to the ring gear shaft 126. This is because the ring gear shaft 126 is mechanically linked with the driving wheels 116 and 118 via the power feed gear 128, the power transmission gear 111, and the differential gear 114. The determination of the torque to be output to the ring gear shaft 126 thus results in determining the torque to be output to the driving wheels 116 and 118. In this embodiment, a map representing the relationship between the revolving speed Nr of the ring gear shaft 126, the accelerator pedal position AP, and the torque command value Tr* is stored in advance into the ROM 190b. In accordance with a concrete procedure of step S104, the torque command value Tr* corresponding to the input accelerator pedal position AP and the input revolving speed Nr of the ring gear shaft 126 is read from the map stored in the ROM 190b. An example of such maps is shown in FIG. 11.

Figure 12:
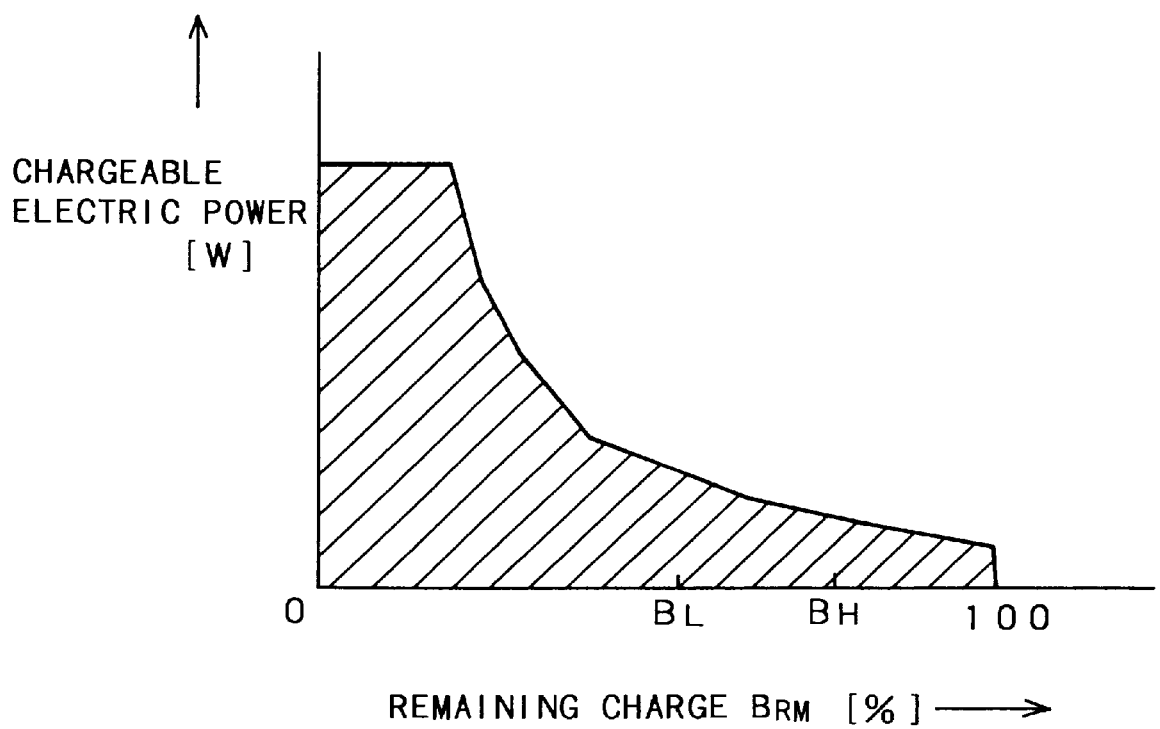
FIG. 12 is a graph showing the chargeable electric power against the remaining charge BRM of the battery 194.

The control CPU 190 then reads the remaining charge BRM of the battery 194 measured by the remaining charge meter 199 at step S108, and specifies power (charge-discharge energy Pb), which the battery 194 is charged with or which is discharged from the battery 194, based on the input remaining charge BRM of the battery 194 at step S110. The charge-discharge energy Pb is set based on the remaining charge BRM of the battery 194, since the chargeable electric power or the dischargeable electric power of the battery 194 as well as appropriate charging voltage, discharging voltage, charging current, and discharging current vary with the remaining charge BRM. FIG. 12 is a graph showing the relationship between the remaining charge BRM of the battery 194 and the chargeable electric power. In the graph, threshold values BL and BH define an appropriate range of the battery 194 in the embodiment. The concrete procedure of the embodiment specifies the charging energy based on the remaining charge BRM as the charge-discharge energy Pb when the remaining charge BRM of the battery 194 is less than the threshold value BL. The procedure specifies the discharging energy based on the remaining charge BRM as the charge-discharge energy Pb, on the contrary, when the remaining charge BRM of the battery 194 is greater than the threshold value BH. In this embodiment, the charge-discharge energy Pb is set as a positive value in the case of the charging energy and as a negative value in the case of the discharging energy. The optimum charge-discharge energy Pb against each remaining charge BRM of the battery 194 is determined experimentally or otherwise and stored as a map (not shown) in advance into the ROM 190b. In accordance with a concrete procedure of step S110, the charge-discharge energy Pb corresponding to the remaining charge BRM of the battery 194 is read from the map stored in the ROM 190b.

At subsequent step S112, the control CPU 190 calculates required energy Pn as the sum of the calculated energy Pr to be output to the ring gear shaft 126, the specified charge-discharge energy Pb, and auxiliary machine-driving energy Ph required for driving auxiliary machines (not shown). The auxiliary machines, for example, a compressor of an air-conditioner or a pump of cooling water, are driven by the power output from the engine 150. The control CPU 190 then divides the required energy Pn by an efficiency it of torque conversion by the planetary gear 120, the first motor MG1, and the second motor MG2 and thereby calculates energy Pe to be output from the engine 150 at step S114. The control CPU 190 subsequently sets a target torque Te* and a target revolving speed Ne* of the engine 150 based on the calculated energy Pe at step S116. The energy Pe output from the engine 150 is equal to the product of the torque Te and the revolving speed Ne of the engine 150, so that the relationship between the energy Pe, the target engine speed Ne*, and the target engine torque Te* can be defined as Pe=Ne*×Te*. There are, however, numerous combinations of the target torque Te* and the target revolving speed Ne* of the engine 150 satisfying the above relationship. In this embodiment, the optimum driving point against each value of the energy Pe is experimentally or otherwise determined as the optimum combination of the target engine torque Te* and the target engine speed Ne*. At the optimum driving point, the engine 150 is driven at the highest possible efficiency and the driving state of the engine 150 smoothly changes with a variation in energy Pe. The relationship between the optimum driving point and the energy Pe is stored in advance as a map into the ROM 190b. In accordance with a concrete procedure of step S116, the optimum combination of the target engine torque Te* and the target engine speed Ne* corresponding to the energy Pe is read from the map stored in the ROM 190b. The details of the map are discussed below.

Figure 13:
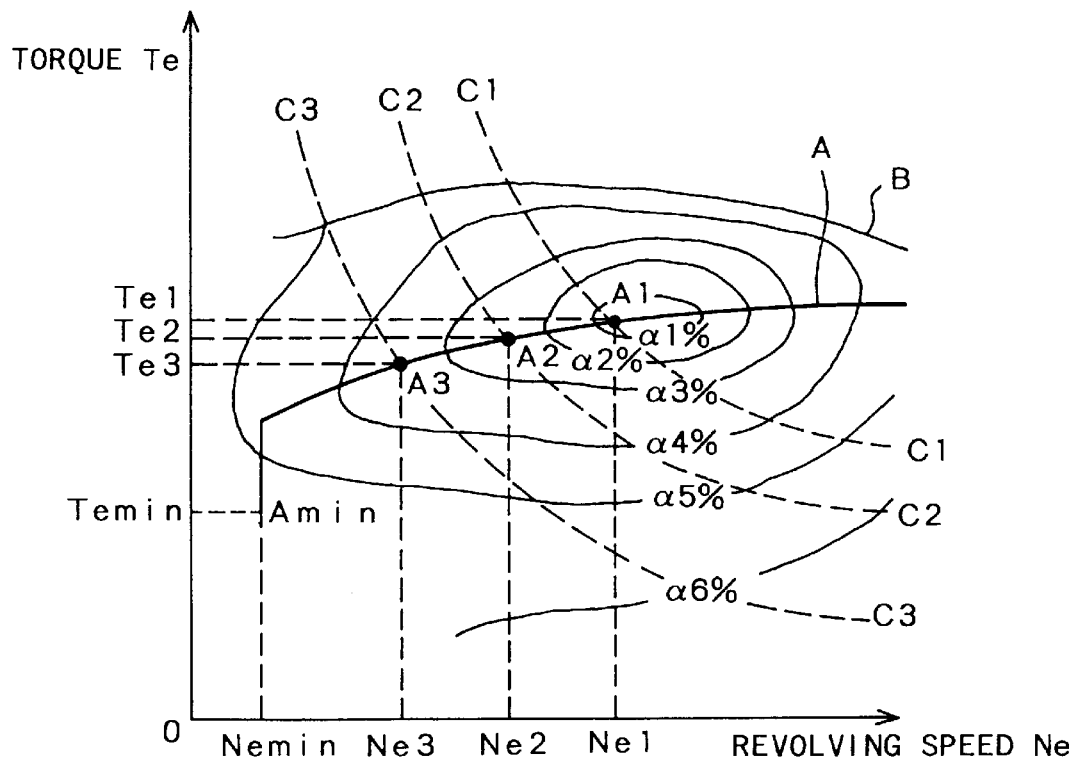
FIG. 13 is a graph showing the driving points of the engine 150 at various efficiencies.

FIG. 13 is a graph showing the relationship between the driving point of the engine 150 and the efficiency of the engine 150. The curve B in FIG. 13 represents a boundary of an engine-operable range, in which the engine 150 can be driven. In the engine-operable range, efficiency curves, such as curves α1 through α6, can be drawn by successively joining the driving points having the identical efficiency according to the characteristics of the engine 150. In the engine-operable range, constant energy curves expressed as the product of the torque Te and the revolving speed Ne, such as curves C1—C1 through C3—C3, can also be drawn. The graph of FIG. 14 shows the efficiency of the respective driving points along the constant energy curves C1—C1 through C3—C3 plotted against the revolving speed Ne of the engine 150.

Figure 14:
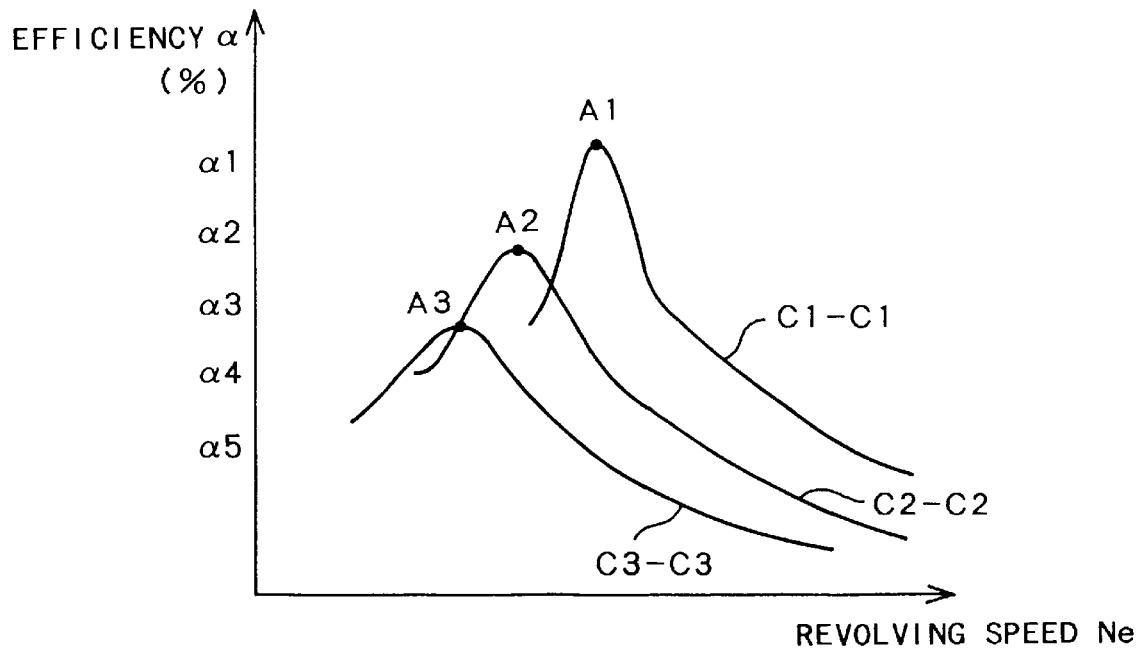
FIG. 14 is a graph showing the efficiency at various driving points of the engine 150 on constant energy curves plotted against the revolving speed Ne of the engine 150.

Referring to FIG. 14, even when the energy Pe output from the engine 150 is constant, the efficiency of the engine 150 is significantly varied by its driving point. On the constant energy curve C1—C1, for example, the efficiency of the engine 150 reaches its maximum when the engine 150 is driven at a driving point A1 (torque Te1 and revolving speed Ne1). Such a driving point attaining the highest possible efficiency exists on each constant energy curve, that is, a driving point A2 on the constant energy curve C2—C2 and a driving point A3 on the constant energy curve C3—C3. The curve A (working curve) in FIG. 13 is obtained by joining such driving points attaining the highest possible efficiency of the engine 150 for the respective values of energy Pe by a continuous curve, upon condition that the position TVP of the throttle valve 166 is regulated to cause a little pressure difference of the intake air before and after the throttle valve 166. The reason why the throttle valve 166 is regulated to cause a little pressure difference of the intake air before and after the throttle valve 166 will be discussed later. In the embodiment, the map representing the relationship between the driving point (torque Te and revolving speed Ne) on the working curve A and the energy Pe is used at step S116 in the flowchart of FIG. 10, in order to set the target torque Te* and the target revolving speed Ne* of the engine 150.

The working curve A should be continuous because of the following reason. In case that a discontinuous curve is used to set the driving point of the engine 150 corresponding to the varying energy Pe, the driving state of the engine 150 abruptly changes with a variation in energy Pe over the discontinuous driving points. The abrupt change may prevent the driving state from being smoothly shifted to a target level, thereby causing knock or even an abrupt stop of the vehicle. When the working curve A is continuous, each driving point on the working curve A may not correspond to the driving point of the highest possible efficiency on the constant energy curve. In the graph of FIG. 13, a driving point Amin defined by a torque Temin and a revolving speed Nemin represents a driving point of minimum energy that can be output from the engine 150.

After specifying the target revolving speed Ne* and the target torque Te* of the engine 150, the control CPU 190 calculates a torque command value Tm2* of the second motor MG2 from the preset target engine torque Te* and the torque command value Tr* according to Equation (5) given below at step S118. Equation (5) gives the torque command value Tm2* set in the second motor MG2 when the engine 150 is stationarily driven at the driving point of the target revolving speed Ne* and the target torque Te* and the torque corresponding to the torque command value Tr* is stationarily output to the ring gear shaft 126. Equation (5) can be obtained from the equilibrium of forces on the dynamic collinear line in the nomograms of FIGS. 5 and 6.

$$Tm2^* \leftarrow Tr^* - Tc^* \times \frac{1}{1+\rho} \tag{5}$$

Figure 15:
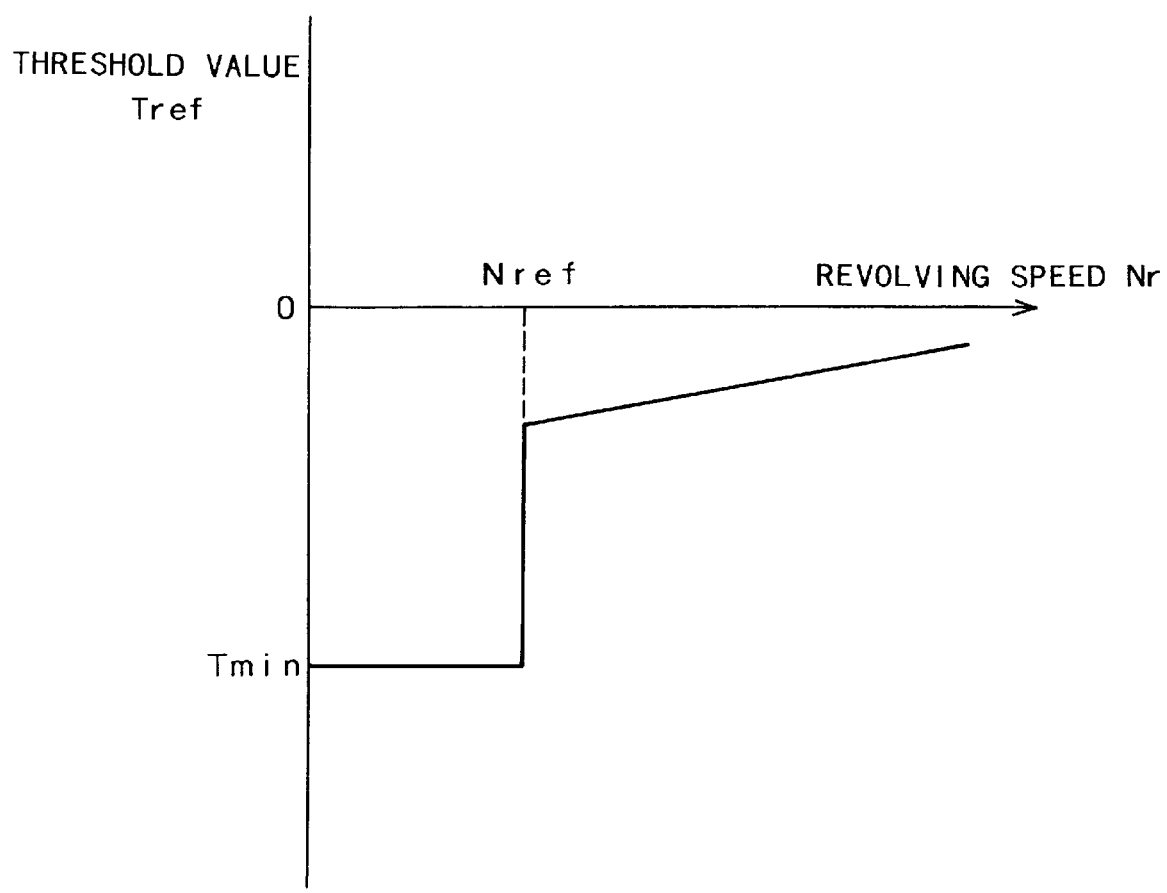
FIG. 15 is a graph showing the relationship between the threshold value Tref and the revolving speed Nr of the ring gear shaft 126.

The control CPU 190 then determines a threshold value Tref based on the revolving speed Nr of the ring gear shaft 126 at step S120, and compares the calculated torque command value Tm2* with the threshold value Tref at step S122. The threshold value Tref expresses the maximum of an allowable range of energy circulation discussed with the schematic diagrams of FIGS. 8 and 9 as the minimum torque of the second motor MG2, and is related to the revolving speed Nr of the ring gear shaft 126 as discussed previously with the nomograms of FIGS. 5 and 6. In the embodiment, a map representing the relationship between the revolving speed Nr of the ring gear shaft 126 and the threshold value Tref, such as one shown in FIG. 15, is stored in advance into the ROM 190b. The concrete procedure of step S120 reads the threshold value Tref corresponding to the input revolving speed Nr from the map stored in the ROM 190b. Substantially no circulation of large energy occurs in the case of the low revolving speed Nr of the ring gear shaft 126. The procedure of the embodiment accordingly sets a minimum torque Tmin that can be output from the second motor MG2 to the threshold value Tref when the revolving speed Nr of the ring gear shaft 126 is lower than a threshold value Nref.

When the torque command value Tm2* is smaller than the threshold value Tref at step S122, it is determined that a circulation of large energy out of the allowable range occurs to significantly lower the energy efficiency of the power output apparatus 110. The control CPU 190 thus regards the threshold value Tref as the torque Tm2 output from the second motor MG2 and calculates and resets the target torque Te* of the engine 150 according to Equation (6) given below at step S124. The control CPU 190 then divides the output energy Pe by the reset target engine torque Te* to reset the target engine speed Ne* at step S126.

$$Te^* \leftarrow (Tr^* - Tref) \times (1+\rho) \tag{6}$$

Figure 16:
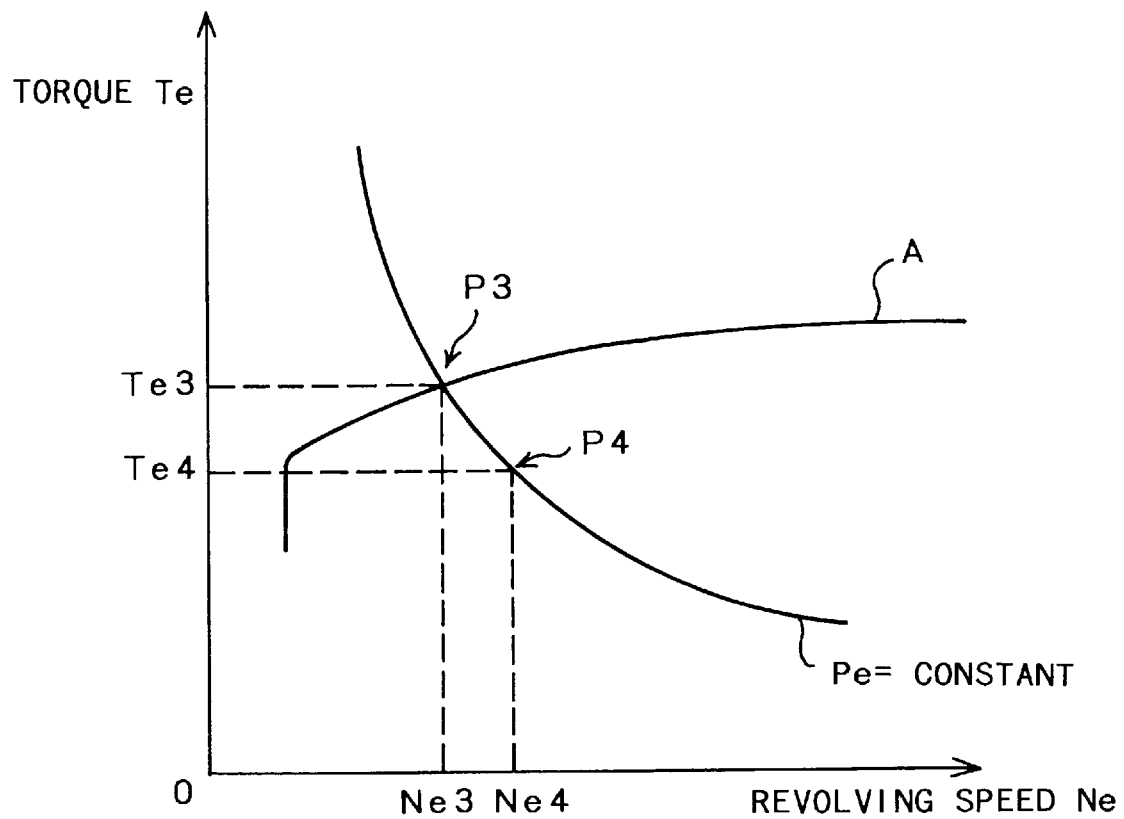
FIG. 16 is a graph showing changes in target torque Te* and the target revolving speed Ne* after the reset operation.

FIG. 16 illustrates the relationship between the target engine torque Te* and the target engine speed Ne* before and after the reset operation. It is here assumed that the target engine torque Te* and the target engine speed Ne* prior to the reset operation are set to realize a driving point P3 on the working curve A, which is defined by a torque Te3 and a revolving speed Ne3. The threshold value Tref is greater than the torque command value Tm2* calculated according to Equation (5). The target engine torque Te* reset according to Equation (6) is thus given as a torque Te4 that is smaller than the torque Te3. A revolving speed Ne4 obtained by dividing the energy Pe by the reset target engine torque Te* is then set to the target engine speed Ne*. The target driving point of the engine 150 is accordingly shifted from the driving point P3 to a driving point P4 on the constant energy curve. In this manner, the target torque Te* and the target revolving speed Ne* of the engine 150 are reset using the threshold value Tref. When the engine 150 is stationarily driven at a driving point defined by the reset target revolving speed Ne* and target torque Te*, the second motor MG2 outputs the torque corresponding to the threshold value Tref. This structure thus enables a circulation of energy within the allowable range.

When the torque command value Tm2* is not smaller than the threshold value Tref at step S122, on the other hand, it is determined that there is no circulation of energy or that a circulation of energy is within the allowable range. In this case, the control CPU 190 does not reset the target torque Te* or the target revolving speed Ne* of the engine 150.

After the target torque Te* and the target revolving speed Ne* of the engine 150 are reset at steps S124 and S126 or when the torque command value Tm2* is determined to be not smaller than the threshold value Tref at step S122, the control CPU 190 replaces the revolving speed Ne with the target revolving speed Ne* and calculates a target revolving speed Ns* of the sun gear shaft 125 according to Equation (2) at step S128. The program then proceeds to steps S130 through S134 to control the first motor MG1, the second motor MG2, and the engine 150 using the preset values. In the embodiment, as a matter of convenience of illustration, the control operations of the first motor MG1, the second motor MG2, and the engine 150 are shown as separate steps. In the actual procedure, however, these control operations are carried out in parallel and comprehensively. By way of example, the control CPU 190 simultaneously controls the first motor MG1 and the second motor MG2 by utilizing an interrupting process, while transmitting an instruction to the EFIECU 170 through communication in order to cause the EFIECU 170 to control the engine 150 concurrently.

Figure 17:
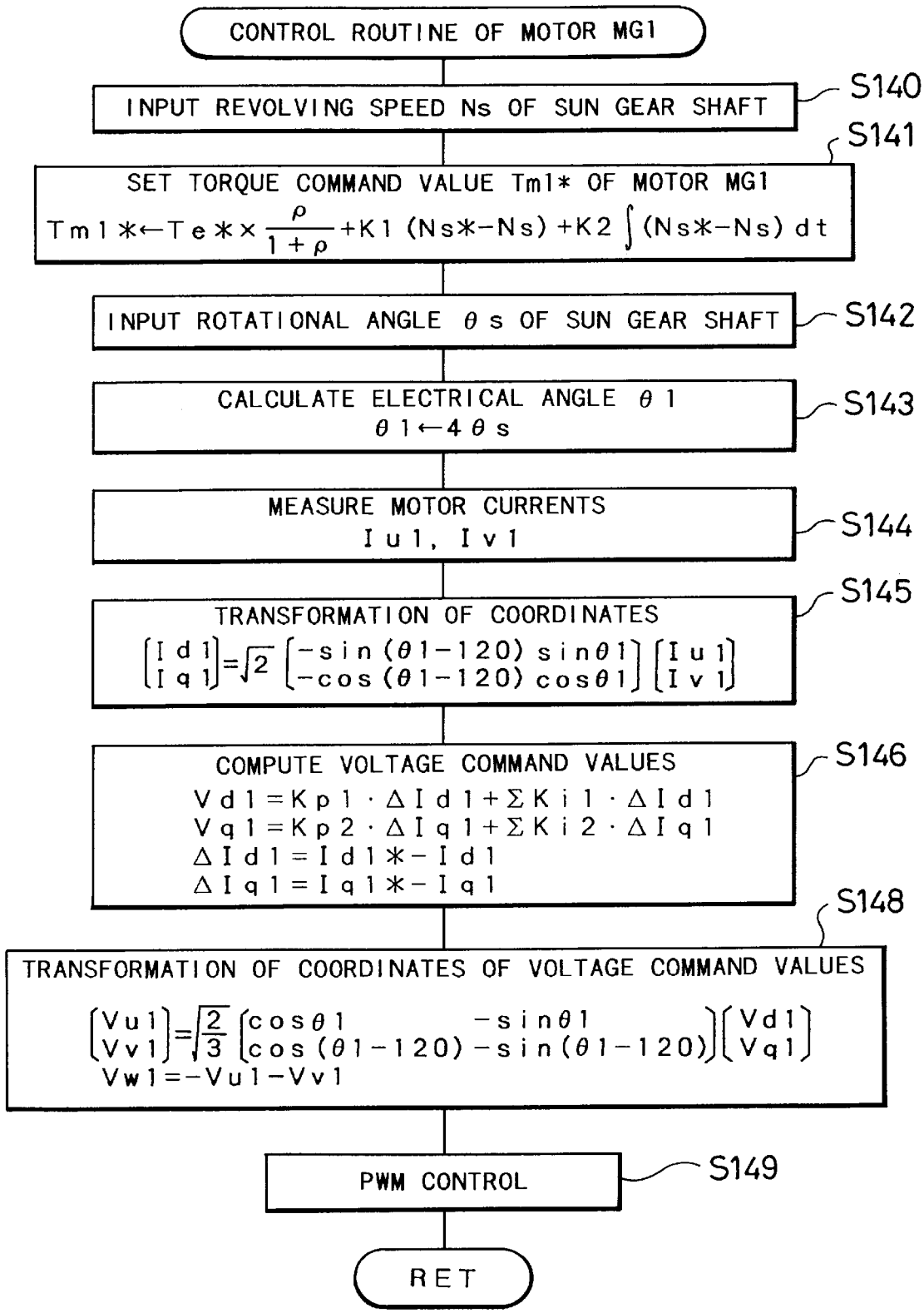
FIG. 17 is a flowchart showing a control routine of the first motor MG1 executed by the control CPU 190 of the controller 180.

The control operation of the first motor MG1 (step S130 in the flowchart of FIG. 10) follows the control routine of the first motor MG1 shown in the flowchart of FIG. 17. The control routine of the first motor MG1 is repeatedly executed at predetermined time intervals (for example, at every 8 msec) by the control CPU 190 utilizing the interrupting process as mentioned above. When the program enters the routine of FIG. 17, the control CPU 190 of the controller 180 first reads the revolving speed Ns of the sun gear shaft 125 at step S140, and calculates a torque command value Tm1* of the first motor MG1 from the input revolving speed Ns according to Equation (7) given below at step S141. The revolving speed Ns of the sun gear shaft 125 may be calculated from the rotational angle θs of the sun gear shaft 125 detected by the resolver 139. The first term on the right side of Equation (7) is obtained from the equilibrium of forces on the dynamic collinear line in the nomograms of FIGS. 5 and 6. The second term on the right side is a proportional term to cancel the deviation of the actual revolving speed Ns from the target revolving speed Ns*, and the third term on the right side is an integral term to cancel the stationary deviation. In the stationary state (that is, when the deviation of the revolving speed Ns from the target revolving speed Ns* is equal to zero), the torque command value Tm1* of the first motor MG1 is set equal to the first term on the right side obtained from the equilibrium on the dynamic collinear line. K1 and K2 in Equation (7) denote proportional constants.

$$Tm1^* \leftarrow Te^* - \frac{\rho}{1+\rho} + K1(Ns^* - Ns) + K2 \int (Ns^* - Ns)dt \quad (7)$$

The control CPU 190 reads the rotational angle θs of the sun gear shaft 125 detected by the resolver 139 at step S142, and calculates an electrical angle θ1 of the first motor MG1 from the input rotational angle θs at step S143. In this embodiment, since a synchronous motor of four-pole pair (that is, four N poles and four S poles) is used as the first motor MG1, the rotational angle θs of the sun gear shaft 125 is quadrupled to yield the electrical angle θ1 (θ1=4θs). The control CPU 190 then detects values of currents Iu1 and Iv1 flowing through the U phase and V phase of the three-phase coils 134 in the first motor MG1 with the ammeters 195 and 196 at step S144. Although the currents naturally flow through all the three phases U, V, and W. measurement is required only for the currents passing through the two phases since the sum of the currents is equal to zero. At subsequent step S145, the control CPU 190 executes transformation of coordinates (three-phase to two-phase transformation) using the values of currents flowing through the three phases obtained at step S144. The transformation of coordinates maps the values of currents flowing through the three phases to the values of currents passing through d and q axes in the permanent magnet-type synchronous motor and is executed according to Equation (8) given below. The transformation of coordinates is carried out because the currents flowing through the d and q axes are essential for the torque control in the permanent magnet-type synchronous motor. Alternatively, the torque control may be executed directly with the currents flowing through the three phases.

$$\begin{bmatrix} Id1 \\ Iq1 \end{bmatrix} = \sqrt{2} \begin{bmatrix} -\sin(\theta1 - 120) & \sin\theta1 \\ -\cos(\theta1 - 120) & \cos\theta1 \end{bmatrix} \begin{bmatrix} Iu1 \\ Iv1 \end{bmatrix} \quad (8)$$

After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1, and subsequently determines voltage command values Vd1 and Vq1 with respect to the d and q axes at step S146. In accordance with a concrete procedure, the control CPU 190 executes arithmetic operations of Equations (9) and Equations (10) given below. In Equations (10), Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (10)) and a summation of historical data of the deviations ΔI for 'i' times (the second term on the right side).

$$\Delta Id1 = Id1^* - Id1$$

$$\Delta Iq1 = Iq1^* - Iq1 \quad (9)$$

$$Vd1 = Kp1 \cdot \Delta Id1 + \Sigma Ki1 \cdot \Delta Id1$$

$$Vq1 = Kp2 \cdot \Delta Iq1 + \Sigma Ki2 \cdot \Delta Iq1 \quad (10)$$

The control CPU 190 then re-transforms the coordinates of the voltage command values thus obtained (two-phase to three-phase transformation) at step S148. This corresponds to an inverse of the transformation executed at step S145. The inverse transformation determines voltages Vu1, Vv1, and Vw1 actually applied to the three-phase coils 134 as expressed by Equations (11) given below:

$$\begin{bmatrix} Vu1 \\ Vv1 \end{bmatrix} = \sqrt{\frac{2}{3}} \begin{bmatrix} \cos\theta1 & -\sin\theta1 \\ \cos(\theta1 - 120) & -\sin(\theta1 - 120) \end{bmatrix} \begin{bmatrix} Vd1 \\ Vq1 \end{bmatrix} \quad (11)$$

$$Vw1 = -Vu1 - Vv1$$

The actual voltage control is accomplished by on-off operation of the transistors Tr1 through Tr6 in the first driving circuit 191. At step S149, the on- and off-time of the transistors Tr1 through Tr6 in the first driving circuit 191 is PWM (pulse width modulation) controlled, in order to attain the voltage command values Vu1, Vv1, and Vw1 determined by Equations (11) given above.

It is assumed that the torque command value Tm1* of the first motor MG1 is positive when the torque Tm1 is applied in the direction shown in the nomograms of FIGS. 5 and 6. For an identical positive torque command value Tm1*, the first motor MG1 is controlled to carry out the regenerative operation when the torque command value Tm1* acts in reverse of the rotation of the sun gear shaft 125 as in the state of the nomogram of FIG. 5, and controlled to carry out the power operation when the torque command value Tm1* acts in the direction of rotation of the sun gear shaft 125 as in the state of the nomogram of FIG. 6. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a positive torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The control routine of the first motor MG1 shown in the flowchart of FIG. 17 is thus applicable to both the regenerative operation and the power operation. When the torque command value Tm1* is negative, the rotational angle θs of the sun gear shaft 125 read at step S142 varies in a reverse direction. The control routine of the first motor MG1 shown in FIG. 17 is thus also applicable to this case.

Figure 18:
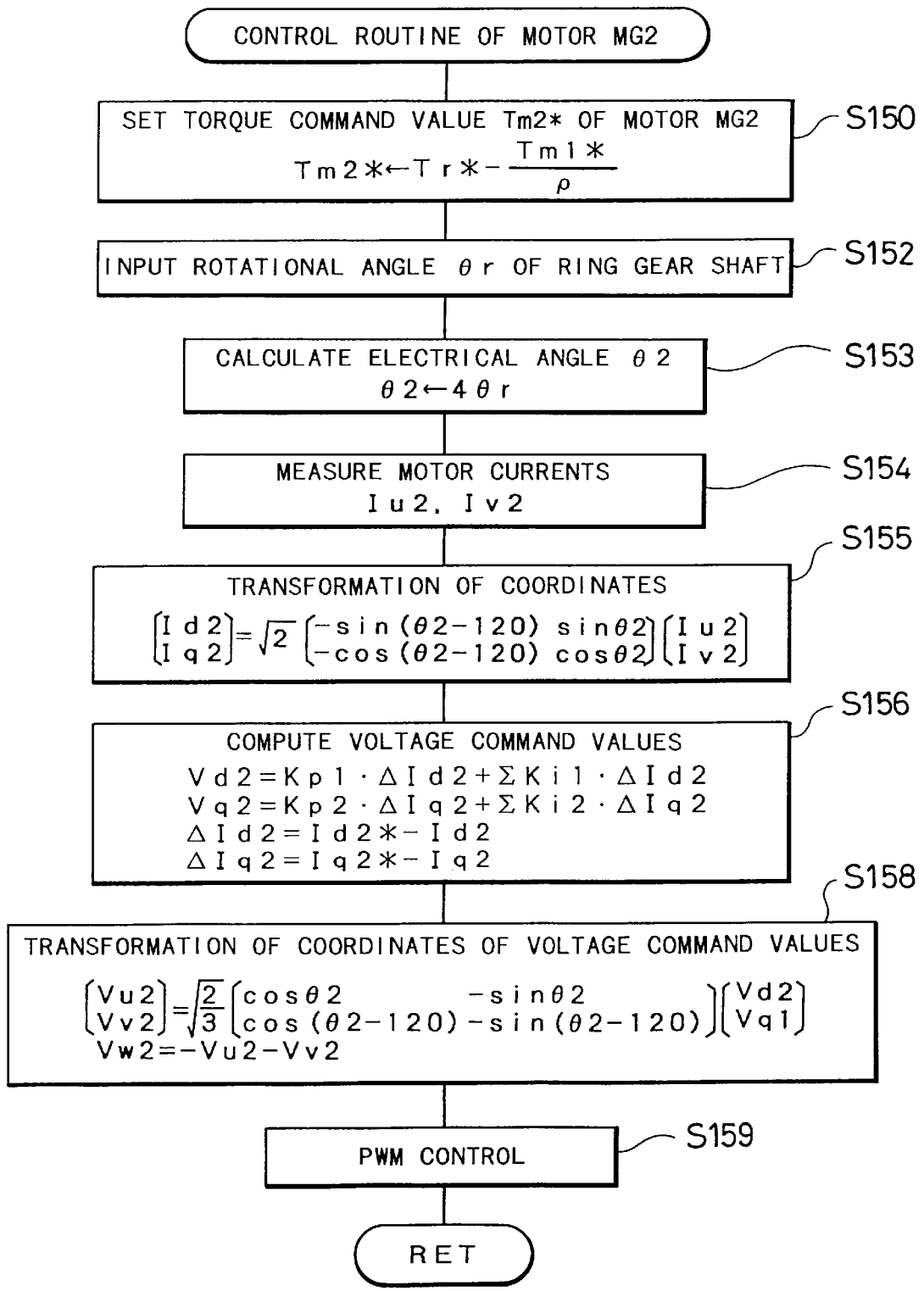
FIG. 18 is a flowchart showing a control routine of the second motor MG2 executed by the control CPU 190 of the controller 180.

The control operation of the second motor MG2 (step S132 in the flowchart of FIG. 10) follows the control routine of the second motor MG2 shown in the flowchart of FIG. 18. The control routine of the second motor MG2 is also repeatedly executed at predetermined time intervals (for example, at every 8 msec) by the control CPU 190 utilizing the interrupting process as mentioned above. When the program enters the routine of FIG. 18, the control CPU 190 of the controller 180 first sets a torque command value Tm2* of the second motor MG2 according to Equation (12) given below and then carries out the processing of steps S152 through S159, which is similar to the processing of steps S142 through S149 in the control routine of the first motor MG1. The control CPU 190 reads the rotational angle θr of the ring gear shaft 126 detected by the revolver 149 at step S152, and calculates an electrical angle θ2 of the second motor MG2 from the input rotational angle θr (θ2=4θr) at step S153. At subsequent step S154, phase currents Iu2 and Iv2 of the second motor MG2 are measured with the ammeters 197 and 198. The control CPU 190 then executes transformation of coordinates for the phase currents at step S155, computes voltage command values Vd2 and Vq2 at step S156, and executes inverse transformation of coordinates for the voltage command values at step S158. The control CPU 190 subsequently determines the on- and off-time of the transistors Tr11 through Tr16 in the second driving circuit 192 for the second motor MG2 and carries out the PWM control at step S159.

$$Tm2^* \leftarrow Tr^* - \frac{Tm1^*}{\rho} \quad (12)$$

The second motor MG2 is also controlled to carry out either the regenerative operation or the power operation, based on the relationship between the direction of the torque command value Tm2* and the direction of the rotation of the ring gear shaft 126. Like the first motor MG1, the control process of the second motor MG2 shown in the flowchart of FIG. 18 is applicable to both the regenerative operation and the power operation. In this embodiment, it is assumed that the torque command value Tm2* of the second motor MG2 is positive when the torque Tm2 is applied in the direction shown in the nomogram of FIG. 5.

The control operation of the engine 150 (step S134 in the flowchart of FIG. 10) is executed in the following manner. The torque Te and the revolving speed Ne of the engine 150 are regulated to enable the engine 150 to be kept in a stationary driving state at the preset driving point defined by the target engine torque Te* and the target engine speed Ne*. In accordance with a concrete procedure, the control CPU 190 transmits an instruction to the EFIECU 170 through communication, and the EFIECU 170 regulates the amount of fuel injection from the fuel injection valve 151 and the position TVP of the throttle valve 166, thereby enabling the output torque and the revolving speed of the engine 150 to gradually approach to the target engine torque Te* and the target engine speed Ne*. As shown in Equation (7) given above, regulation of the revolving speed Ne of the engine 150 depends upon the control of the revolving speed Ns of the sun gear shaft 125 by the first motor MG1. The control of the engine 150 thus implies the open-close control of the throttle valve 166, the control of the air/fuel ratio with respect to the amount of intake air, and the control of the open-close timing BT of the air intake valve 152 by the open-close timing change mechanism 153, in order to enable an output of the target torque Te* from the engine 150.

When the target revolving speed Ne* and the target torque Te* of the engine 150 are set as a driving point on the working curve A shown in FIGS. 13 and 16, the control procedure of the engine 150 reads the position TVP of the throttle valve 166 and the open-close timing BT of the air intake valve 152 corresponding to the energy Pe to be output from the engine 150 (that is, the target revolving speed Ne* and the target torque Te*) from a map stored in advance in the ROM 190b. The procedure then drives the actuator 168 and the open-close timing change mechanism 153, in order to realize the position TVP and the timing BT read from the map. The map previously stored in the ROM 190b is obtained by experimentally determining the position TVP of the throttle valve 166 and the open-close timing BT of the air intake valve 152 which enable the engine 150 to be driven at a high efficiency at the driving point on the working curve A that outputs the energy Pe.

Figure 19:
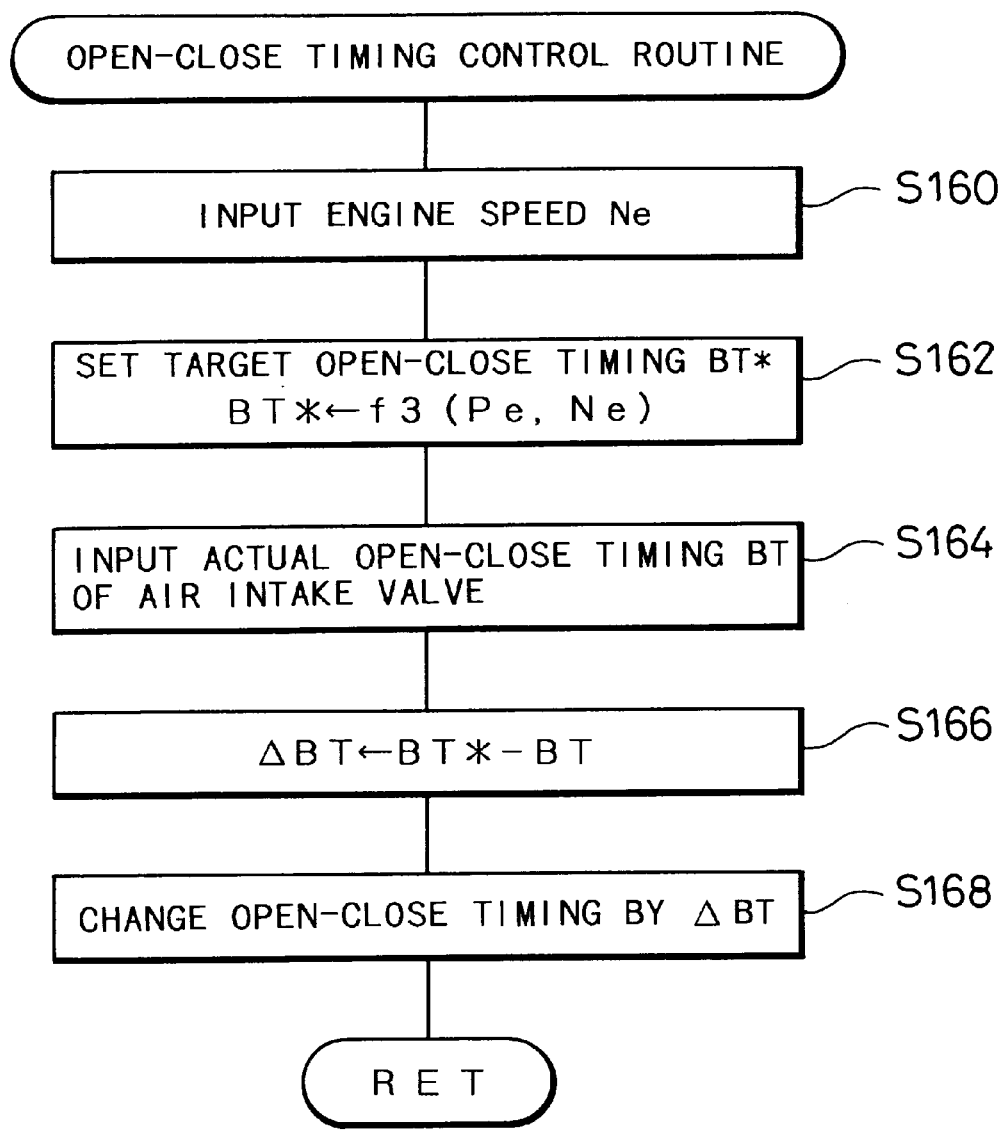
FIG. 19 is a flowchart showing an open-close timing control routine executed by the control CPU 190 of the controller 180.

When the target revolving speed Ne* and the target torque Te* of the engine 150 are reset at steps S124 and S126 in the torque control routine of FIG. 10, the control procedure of the engine 150 drives the actuator 168 to realize the position TVP of the throttle valve 166 corresponding to the output energy Pe, while carrying out the open-close timing control routine of FIG. 19 to control the open-close timing BT of the air intake valve 152. The open-close timing control routine is repeatedly executed at predetermined time intervals (for example, at every 20 msec) by the EFIECU 170 utilizing an interrupting process. When the program enters the routine of FIG. 19, the EFIECU 170 first reads the revolving speed Ne of the engine 150 detected by the speed sensor 176 at step S160, and sets a target value BT* of the open-close timing BT (target open-close timing) based on the input revolving speed Ne and the energy Pe to be output from the engine 150 at step S162. In the embodiment, the open-close timing BT to enable an output of the energy Pe from the engine 150, which is driven to realize the revolving speed Ne at the reset position TVP of the throttle valve 166, is determined experimentally or otherwise and stored in advance as a map into an internal ROM (not shown) included in the EFIECU 170. The concrete procedure of step S162 reads the open-close timing BT corresponding to the energy Pe and the revolving speed Nr from the map as the target open-close timing BT*.

Figure 20:
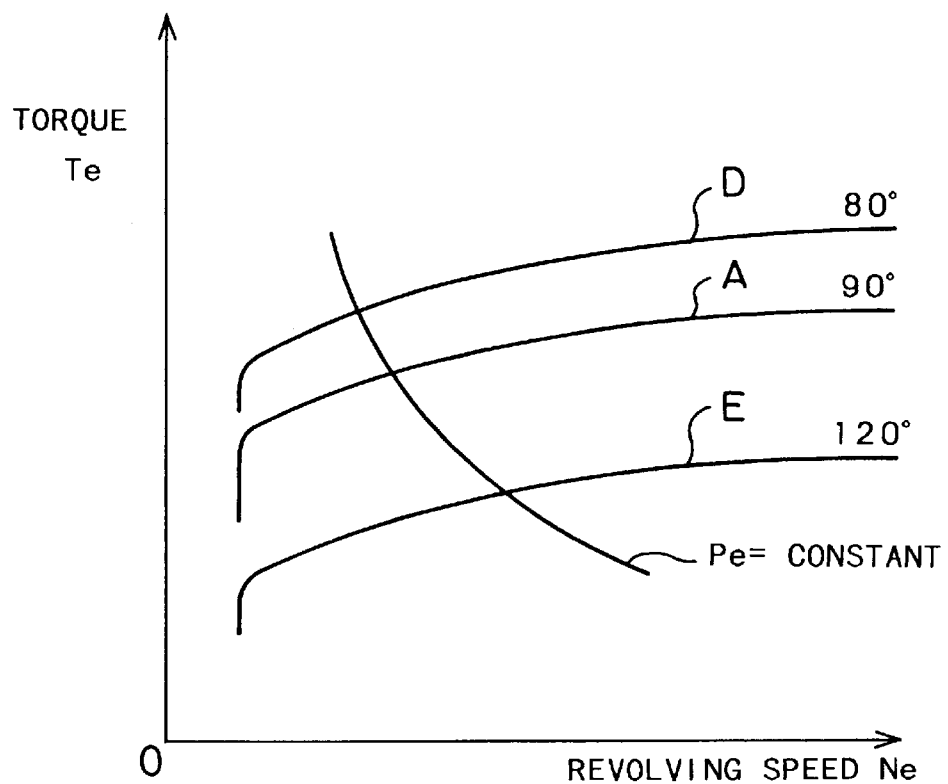
FIG. 20 is a graph showing working curves of the engine 150 at various open-close timings BD.

The graph of FIG. 20 shows the working curves of the engine 150 with the varying open-close timing BT. The curve A corresponds to the above working curve A when the open-close timing BT is at a standard position without any lead or lag. The curve D represents a working curve of the engine 150 when the open-close timing BT is led to the angle of 80 degrees, whereas the curve E represents a working curve of the engine 150 when the open-close timing BT is lagged to the angle of 120 degrees. These angles represent the rotational angles of the crankshaft 156 at the time of closing the air intake valve 152 when the standard is set at the bottom dead center or the lower-most point of the piston 155. As shown in FIG. 20, when the constant energy Pe is output from the engine 150, lagging the open-close timing BT enables the driving point of the engine 150 to be shifted toward the lower torque and the higher revolving speed. Namely lagging the open-close timing BT according to the revolving speed Ne of the engine 150 enables the driving point of the engine 150 to be shifted toward the lower torque and the higher revolving speed on the constant energy curve Pe. The procedure of the embodiment takes advantage of this relationship and sets the target open-close timing BT* to enable the engine 150 to shift toward the lower torque and the higher revolving speed on the constant energy curve Pe.

Figure 21:
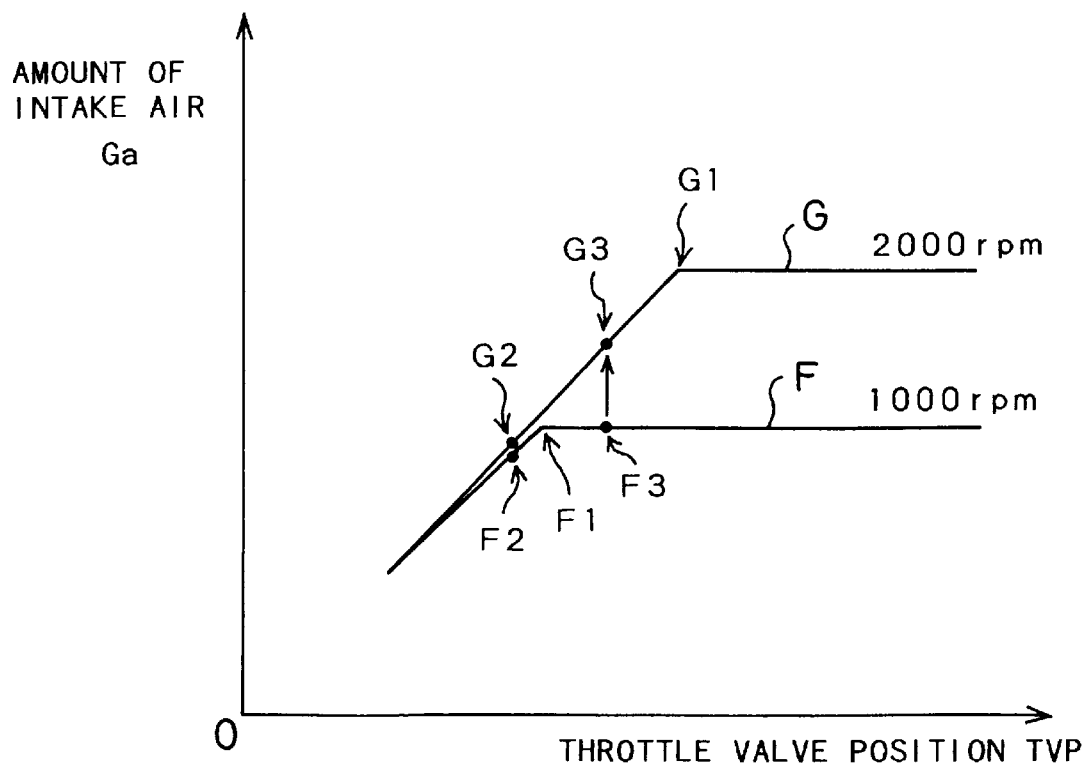
FIG. 21 is a graph showing the amount Ga of intake air plotted against the position TVP of the throttle valve 166.

The following describes the reason why the position TVP of the throttle valve 166 is regulated to cause a little pressure difference of the intake air before and after the throttle valve 166 as mentioned in FIGS. 13 and 14. FIG. 21 is a graph showing the amount Ga of intake air plotted against the position TVP of the throttle valve 166. The curve F shows the amount Ga of intake air against the position TVP of the throttle valve 166 when the engine 150 is driven at 1000 rpm, whereas the curve G shows the amount Ga of intake air against the position TVP of the throttle valve 166 when the engine 150 is driven at 2000 rpm. At points F1 and G1, the amount Ga of intake air stops increasing with an increase in position TVP of the throttle valve 166. These points F1 and G1 represent the points that cause no pressure difference before and after the throttle valve 166 at the respective revolving speeds Ne. Namely the point that causes no pressure difference before and after the throttle valve 166 depends upon the revolving speed Ne of the engine 150.

It is first assumed that the engine 150 is driven at a point F3, which is defined by the revolving speed of 1000 rpm and the position TVP of the throttle valve 166 and causes no pressure difference before and after the throttle valve 166. The control procedure regulates the revolving speed of the first motor MG1 while keeping the position TVP of the throttle valve 166 unchanged, so as to cause the engine 150 to be driven at the revolving speed of 2000 rpm. The driving point of the engine 150 is accordingly shifted from the point F3 to a point G3 with the increased amount Ga of intake air. The engine 150 is driven through stoichiometric injection of the fuel into the amount Ga of intake air, so that the energy Pe output from the engine 150 has a linear relation to the amount Ga of intake air. The shift from the point F3 to the point G3 thus increases the energy Pe output from the engine 150 with an increase in revolving speed Ne of the engine 150.

It is then assumed that the engine 150 is driven at a point F2, which is defined by the revolving speed of 1000 rpm and the position TVP of the throttle valve 166 and causes a little pressure difference before and after the throttle valve 166. The control procedure regulates the revolving speed of the first motor MG1 while keeping the position TVP of the throttle valve 166 unchanged, so as to cause the engine 150 to be driven at the revolving speed of 2000 rpm. The driving point of the engine 150 is accordingly shifted from the point F2 to a point G2 having only little increase in amount Ga of intake air. As mentioned above, the energy Pe output from the engine 150 has a linear relation to the amount Ga of intake air. The shift from the point F2 to the point G2 thus causes substantially no increase in energy Pe output from the engine 150 with an increase in revolving speed Ne of the engine 150.

Based on these facts, the procedure of the embodiment determines the working curve A under the condition that the position TVP of the throttle valve 166 is regulated to cause a little pressure difference of the intake air before and after the throttle valve 166, so as to enable the energy Pe output from the engine 150 to be substantially kept against an increase in revolving speed Ne of the engine 150. Since the energy Pe output from the engine 150 hardly increases with an increase in revolving speed Ne of the engine 150, the control of the open-close timing BT of the air intake valve 152 according to the open-close timing control routine of FIG. 19 is carried out to regulate a little change of the energy Pe with an increase in revolving speed Ne of the engine 150.

Referring back to the open-close timing control routine of FIG. 19, the EFIECU 170 reads the current open-close timing BT of the air intake valve 152 at step S164 and calculates a deviation ΔBT of the current open-close timing BT from the preset target open-close timing BT* at step S166. The current open-close timing BT of the air intake valve 152 is obtained from the cam shaft position detected by the cam shaft position sensor 173. The EFIECU 170 then causes the open-close timing change mechanism 153 to change the open-close timing BT of the air intake valve 152 by the deviation ΔBT at step S168, and exits from this routine.

As discussed above, the power output apparatus 110 of the embodiment ensures a circulation of energy within the allowable range. This increases the ratio of the energy of smaller loss that is directly output from the engine 150 to the ring gear shaft 126 via the planetary gear 120, thereby improving the energy efficiency of the whole apparatus. The structure of the embodiment sets the appropriate allowable range of energy circulation, based on the revolving speed Nr of the ring gear shaft 126.

In the power output apparatus 110 of the embodiment, the threshold value Tref used for specifying the allowable range of energy circulation is set, based on the revolving speed Nr of the ring gear shaft 126. The allowable range of energy circulation depends upon the efficiency of the whole power output apparatus 110. The threshold value Tref may thus be set, based on a factor that affecting the efficiency of the whole power output apparatus 110, for example, the efficiency of the driving point of the engine 150. The allowable range of energy circulation is also varied with the energy Pe to be output from the engine 150. The threshold value Tref may thus be set, based on the charge-discharge energy Pb, which the battery 194 is charged with or which is discharged from the battery 194, or on the auxiliary machine-driving energy Ph required for driving auxiliary machines. Another possible procedure sets the threshold value Tref using these factors in a superposing manner.

Although the threshold value Tref used for specifying the allowable range of energy circulation depends upon the revolving speed Nr of the ring gear shaft 126 in the power output apparatus 110 of the above embodiment, a fixed value may be set to the threshold value Tref, regardless of the revolving speed Nr of the ring gear shaft 126. By way of example, the threshold value Tref may be set equal to zero. In this state, the second motor MG2 always functions as a motor. A motor that does not function as a generator but always works as a motor may accordingly be used as the second motor MG2.

The power output apparatus 110 of the embodiment calculates the torque command value Tm2* of the second motor MG2 from the torque command value Tr* and the target engine torque Te* based on the equilibrium of forces on the dynamic collinear line, and compares the torque command value Tm2* with the threshold value Tref that is based on the revolving speed Nr of the ring gear shaft 126, in order to determine whether or not the energy circulation is within the allowable range. Another possible procedure detects the torque Tr output to the ring gear shaft 126, the torque Te output from the engine 150, and the torque Tm2 output from the second motor MG2 to specify the magnitude of circulating energy, and determines whether or not the energy circulation is within the allowable range. When it is determined that the energy circulation is out of the allowable range, one preferable control procedure increases the revolving speed Ne of the engine 150 by relatively small variations ΔN until the energy circulation reaches the allowable range. This structure enables energy circulation to be kept within the allowable range even in the transient state when the driving state of the engine 150 is being changed.

The power output apparatus 110 of the embodiment determines the energy Pe to be output from the engine 150 by taking into account the charge and discharge of the battery 194 and the energy required for driving the auxiliary machines. In the structure free of the charge or discharge of the battery 194 or in the structure without the auxiliary machines driven by the power output from the engine 150, however, the value obtained by dividing the energy Pr to be output to the ring gear shaft 126 by the efficiency ηt may be set as the energy Pe to be output from the engine 150.

When the target revolving speed Ne* and the target torque Te* of the engine 150 are reset, the power output apparatus 110 of the embodiment lags the open-close timing BT of the air intake valve 152 with an increase in revolving speed Ne of the engine 150, while keeping the position TVP of the throttle valve 166 unchanged, so as to change the driving point of the engine 150 on the constant energy curve Pe. Another possible procedure first controls the revolving speed Ne of the engine 150 to the target revolving speed Ne* and then regulates the open-close timing BT of the air intake valve 152, in order to enable the engine 150 to output the energy Pe. Still another possible procedure first controls the revolving speed Ne of the engine 150 to the target revolving speed Ne* and then regulates the position TVP of the throttle valve 166, in order to enable the engine 150 to output the energy Pe. In these modified structures, it is preferable that the open-close timing BT of the air intake valve 152 or the position TVP of the throttle valve 166 is subjected to feedback control with the torque Te of the engine 150 estimated by the torque command value Tm1* of the first motor MG1.

Figure 22:
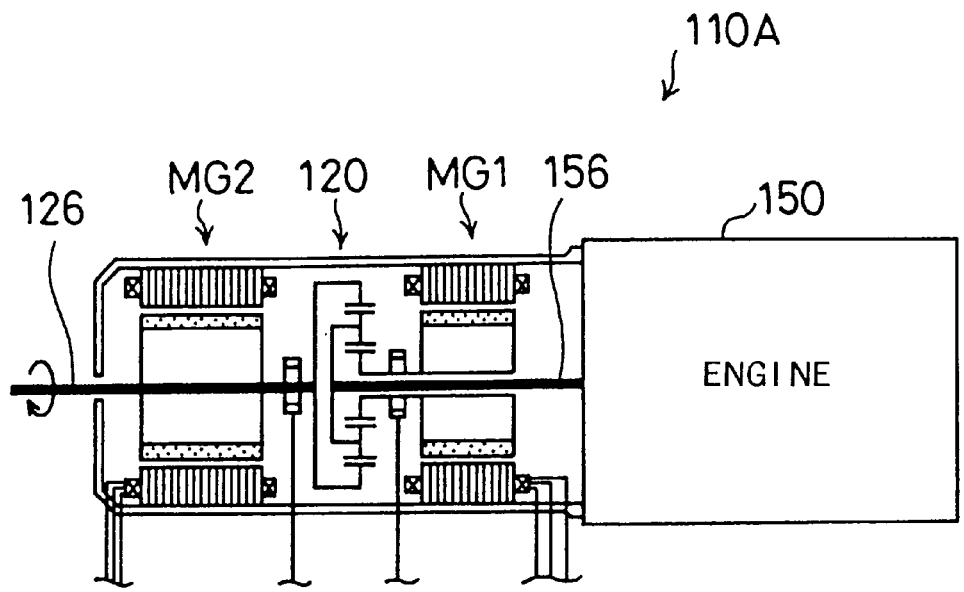
FIG. 22 schematically illustrates structure of another power output apparatus 110A as a modified example of the first embodiment.
Figure 23:
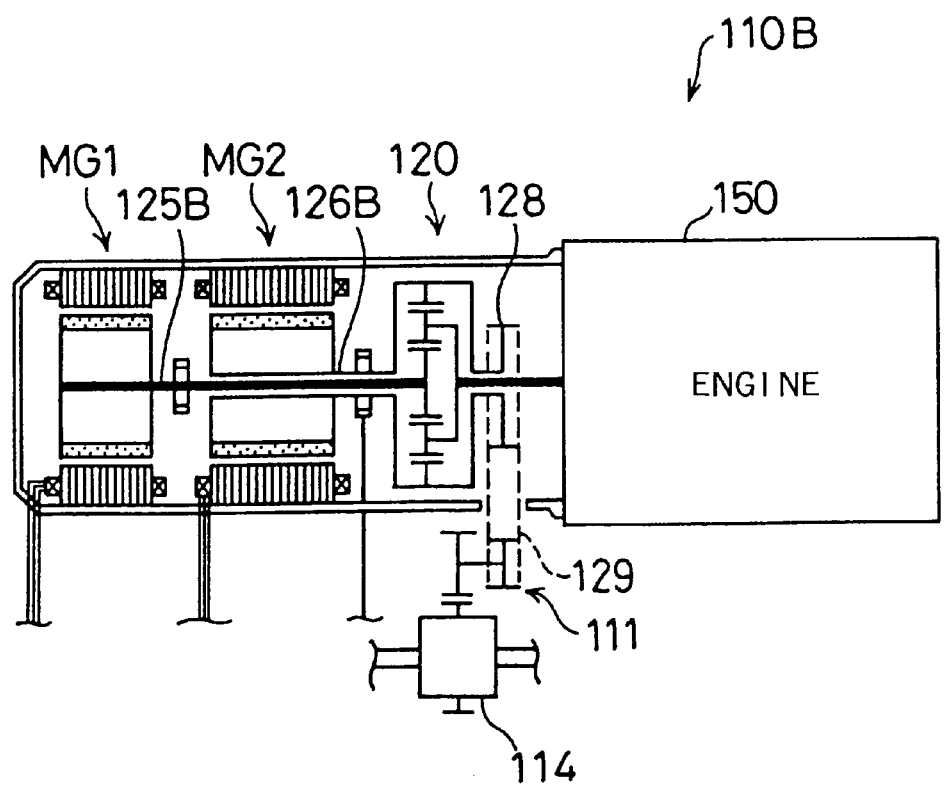
FIG. 23 schematically illustrates structure of still another power output apparatus 110B as another modified example of the first embodiment.

In the power output apparatus 110 of the embodiment, the power output to the ring gear shaft 126 is taken out of the arrangement between the first motor MG1 and the second motor MG2 via the power feed gear 128 linked with the ring gear 122. Like another power output apparatus 110A shown in FIG. 22 as a modified example, however, the power may be taken out of the casing 119, from which the ring gear shaft 126 is extended. FIG. 23 shows still another power output apparatus 110B given as another modified example, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

Figure 24:
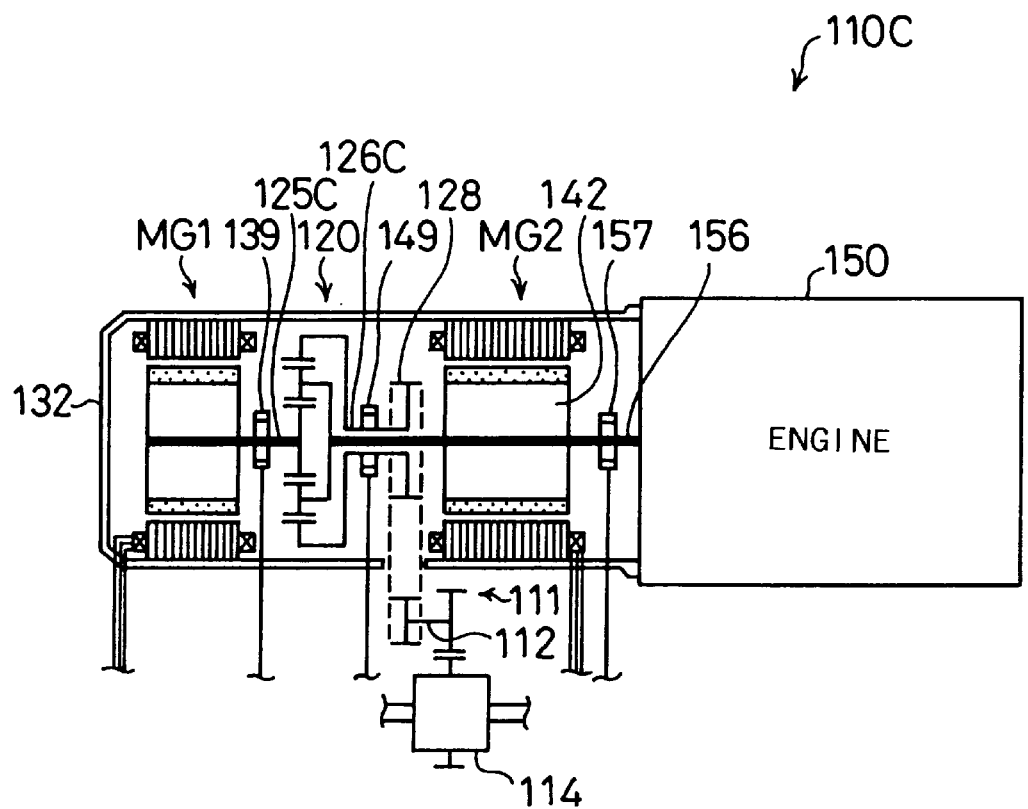
FIG. 24 schematically illustrates structure of a power output apparatus 110C as a second embodiment according to the present invention.

The following describes another power output apparatus 110C as a second embodiment according to the present invention. FIG. 24 schematically illustrates structure of an essential part of the power output apparatus 110C of the second embodiment. Referring to FIG. 24, the power output apparatus 110C of the second embodiment has a similar structure to that of the power output apparatus 110 of the first embodiment, except that the rotor 142 of the second motor MG2 is attached to the crankshaft 156 and that the first motor MG1 and the second motor MG2 have a different configuration. The same constituents as those of the power output apparatus 110 of the first embodiment shown in FIG. 1, such as the controller 180, are omitted from the drawing of FIG. 24. The power output apparatus 110C of the second embodiment can also be mounted on the vehicle as shown in the drawing of FIG. 3. The same constituents in the power output apparatus 110C of the second embodiment as those in the power output apparatus 110 of the first embodiment are shown by like numerals and symbols and not specifically described here. The symbols used in the description of the first embodiment have the same meanings in the description of the second embodiment, unless otherwise specified.

In the power output apparatus 110C of the second embodiment, the engine 150, the second motor MG2, the planetary gear 120, and the first motor MG1 are arranged in this sequence as shown in FIG. 24. The rotor 132 of the first motor MG1 is attached to a sun gear shaft 125C, which connects with the sun gear 121 of the planetary gear 120, whereas the planetary carrier 124 is linked with the crankshaft 156 of the engine 150 like the power output apparatus 110 of the first embodiment. The rotor 142 of the second motor MG2 and a resolver 157 for measuring a rotational angle θe of the crankshaft 156 are further attached to the crankshaft 156. A ring gear shaft 126C, which connects with the ring gear 122 of the planetary gear 120, is linked with the power feed gear 128. A resolver 149 for measuring a rotational angle θr of the ring gear shaft 126C is attached to the ring gear shaft 126C.

The power output apparatus 110C of the second embodiment has a different configuration from that of the power output apparatus 110 of the first embodiment. Like the power output apparatus 110 of the first embodiment, however, the three-phase coils 134 of the first motor MG1 is connected to the first driving circuit 191 of the controller 180, and the three-phase coils 144 of the second motor MG2 to the second driving circuit 192. Although not specifically illustrated, the resolver 157 is connected to the input port of the control CPU 190 of the controller 180 through a signal line.

Figure 25:
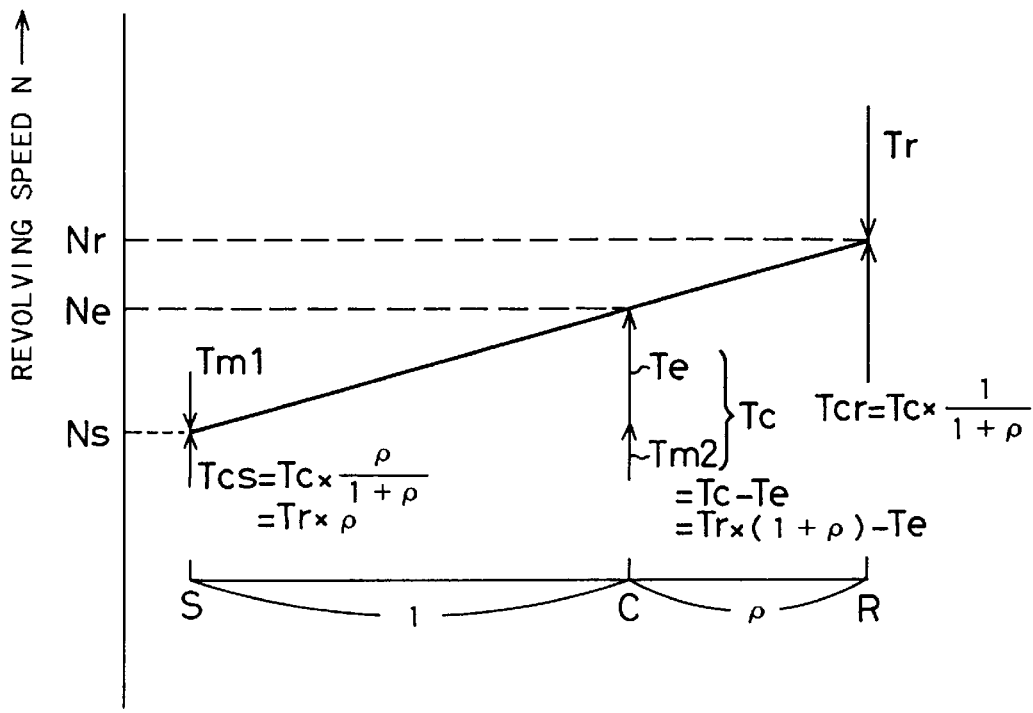
FIG. 25 is a nomogram showing the relationship between the revolving speed and the torque on the three shafts linked with the planetary gear 120 in the power output apparatus 110C of the second embodiment.
Figure 26:
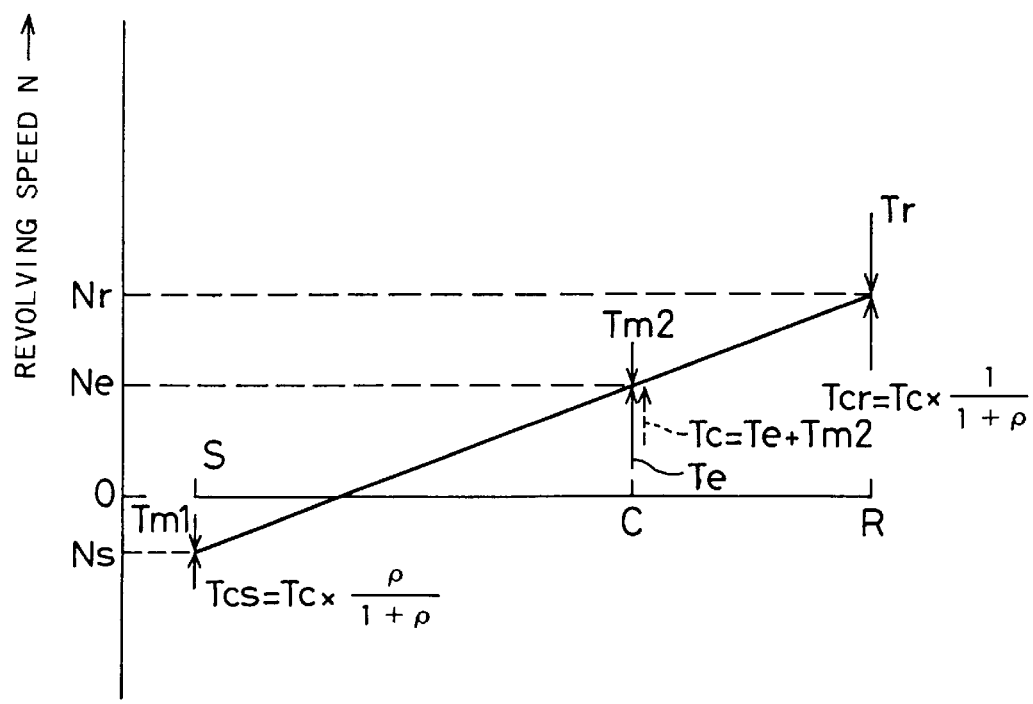
FIG. 26 is a nomogram showing the relationship between the revolving speed and the torque on the three shafts liked with the planetary gear 120 in the power output apparatus 110C of the second embodiment.

The power output apparatus 110C of the second embodiment works in the following manner. By way of example, it is assumed that the engine 150 is driven at a driving point P1 of the revolving speed Ne and the torque Te and outputs an amount of energy Pe (Pe=Ne×Te) and that the ring gear shaft 126C is driven at another driving point P2 of the revolving speed Nr and the torque Tr and outputs an amount of energy Pr (Pr=Nr×Tr) identical with the energy Pe. This means that the power output from the engine 150 is subjected to the torque conversion before being applied to the ring gear shaft 126C. FIGS. 25 and 26 are nomograms in this state.

Equations (13) through (16) given below are obtained from the equilibrium on the dynamic collinear line in the nomogram of FIG. 25. Equation (13) is obtained from the equilibrium of the energy Pe output from the engine 150 with the energy Pr output to the ring gear shaft 126C, and Equation (14) as the total energy input to the planetary carrier 124 via the crankshaft 156. Equations (15) and (16) are led by dividing a torque Tc acting on the planetary carrier 124 into divisional torques Tcs and Tcr acting on the coordinate axes S and R.

$$Te \times Ne = Tr \times Nr \tag{13}$$

$$Tc = Tc + Tm2 \tag{14}$$

$$Tcs = Tc \times \frac{\rho}{1+\rho} \tag{15}$$

$$Tcr = Tc \times \frac{1}{1+\rho} \tag{16}$$

The equilibrium of forces on the dynamic collinear line is essential for the stable state of the dynamic collinear line. It is accordingly required to set the torque Tm1 equal to the divisional torque Tcs and the torque Tr equal to the divisional torque Tcr. The torques Tm1 and Tm2 are thus expressed by Equations (17) and (18) given below:

$$Tm1=Tr\times\rho \tag{17}$$

$$Tm2=Tr\times(1+\rho)-Te \tag{18}$$

The power state output from the engine 150 and defined by the torque Te and the revolving speed Ne is converted to the power state defined by the torque Tr and the revolving speed Nr and output to the ring gear shaft 126C by allowing the first motor MG1 to apply the torque Tm1 expressed by Equation (17) to the sun gear shaft 125C and allowing the second motor MG2 to apply the torque Tm2 expressed by Equation (18) to the crankshaft 156. In the state of the nomogram of FIG. 25, the direction of the torque output from the first motor MG1 is opposite to the direction of the rotation of the rotor 132. The first motor MG1 accordingly functions as a generator and regenerates the electrical energy Pm1 expressed as the product of the torque Tm1 and the revolving speed Ns. The direction of the torque output from the second motor MG2 is, on the other hand, identical with the direction of the rotation of the rotor 142. The second motor MG2 accordingly functions as a motor and consumes the electrical energy Pm2 expressed as the product of the torque Tm2 and the revolving speed Nr.

Figure 27:
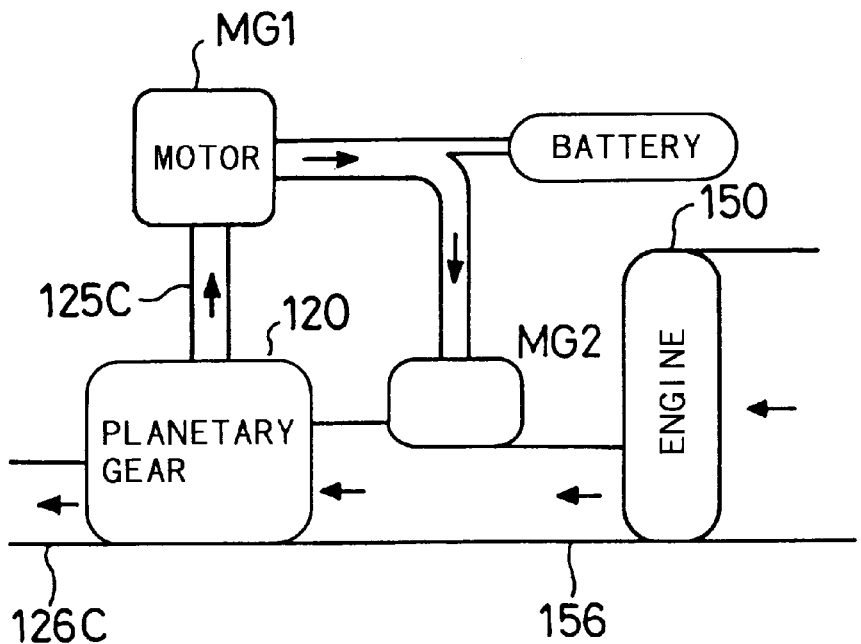
FIG. 27 schematically illustrates an energy flow when the power output apparatus 110C of the second embodiment is in the driving state shown in the nomogram of FIG. 25.

FIG. 27 schematically shows an energy flow in the state of the nomogram of FIG. 25. The planetary gear 120 receives the sum of the mechanical energy output from the engine 150 and the mechanical energy output from the second motor MG2 via its planetary carrier 124, and divides the input mechanical energy into the sun gear shaft 125C and the ring gear shaft 126C based on the equilibrium of forces on the dynamic collinear line. The first motor MG1 attached to the sun gear shaft 125C functions as a generator and converts the division of the mechanical energy given by the planetary gear 120 to the sun gear shaft 125C to electrical energy Pm1 at a specific efficiency and supplies a the regenerated electrical energy Pm1 to the battery 194 and the second motor MG2. It is here assumed that all the electrical energy Pm1 regenerated by the first motor MG1 is supplied to the second motor MG2 without causing charge or discharge of the battery 194. Part of the mechanical energy output from the engine 150 and the second motor MG2 to the crankshaft 156 then goes through a circulation path, which consists of the second motor MG2, the planetary gear 120, the first motor MG1, and again the second motor MG2, and is eventually output to the ring gear shaft 126C. When the power output apparatus 110C of the second embodiment is in the state of the nomogram of FIG. 25, this circulation path of energy is formed by outputting the mechanical energy from the second motor MG2 to the crankshaft 156. The power output from the engine 150 is thus subjected to torque conversion to a desired power state via this circulation path of energy and eventually output to the ring gear shaft 126C. As discussed previously, such energy circulation is not preferable from the viewpoint of the energy efficiency of the whole power output apparatus 110C. In the schematic diagram of FIG. 27, the battery 194 is charged with part of the electrical energy Pm1 regenerated by the first motor MG1. Another possible process takes electrical energy out of the battery 194 and supplies the sum of the electrical energy from the battery 194 and the electrical energy Pm1 regenerated by the first motor MG1 to the second motor MG2.

Although the revolving speed Ns of the sun gear shaft 125C is positive in the nomogram of FIG. 25, it may be negative according to the revolving speed Ne of the engine 150 and the revolving speed Nr of the ring gear shaft 126C as shown in the nomogram of FIG. 26. In the latter case, the first motor MG1 applies the torque in the direction of rotation of the rotor 132 and thereby works as a motor to consume the electrical energy Pm1 given as the product of the torque Tm1 and the revolving speed Ns. The second motor MG2, on the other hand, applies the torque in reverse of the rotation of the rotor 142 and thereby works as a generator to regenerate the electrical energy Pm2, which is given as the product of the torque Tm2 and the revolving speed Nr, from the ring gear shaft 126C.

Figure 28:
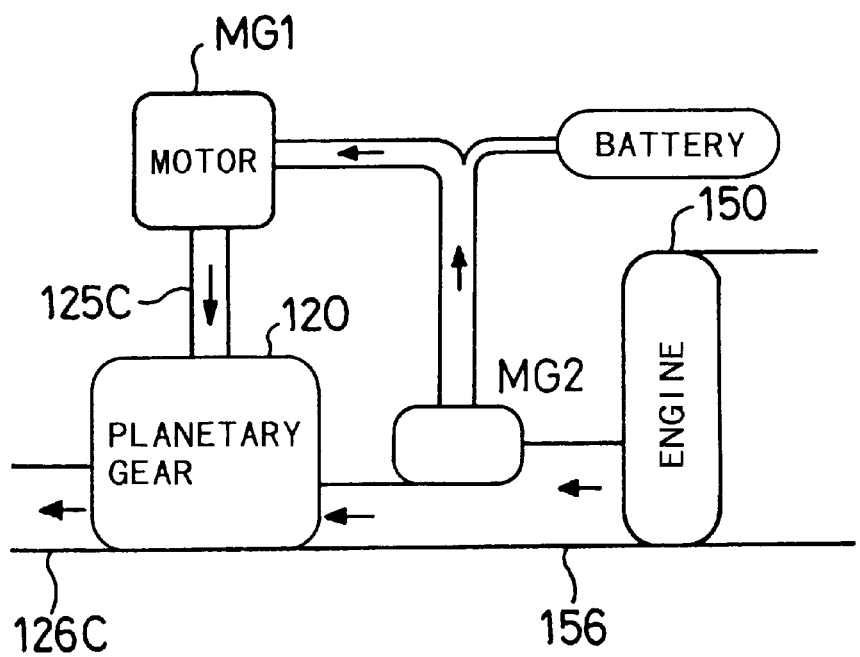
FIG. 28 schematically illustrates an energy flow when the power output apparatus 110C of the second embodiment is in the driving state shown in the nomogram of FIG. 26.

FIG. 28 schematically shows an energy flow in the state of the nomogram of FIG. 26. The second motor MG2 functioning as a generator converts part of the mechanical energy output from the engine 150 to the crankshaft 156 to electrical energy Pm2 at a specific efficiency and supplies the regenerated electrical energy Pm2 to the first motor MG1 functioning as a motor and the battery 194. The planetary gear 120 receives the residue of the mechanical energy output from the engine 150 via its planetary carrier 124 as well as the mechanical energy output from the first motor MG1 via the sun gear shaft 125C, and outputs the total mechanical energy to the ring gear shaft 126C based on the equilibrium of forces on the dynamic collinear line. It is here assumed that all the electrical energy Pm2 regenerated by the second motor MG2 is supplied to the first motor MG1 without causing charge or discharge of the battery 194. The mechanical energy output from the engine 150 to the crankshaft 156 then passes through two pathways and is eventually output to the ring gear shaft 126C. The first pathway goes through the planetary gear 120 and directly outputs the mechanical energy to the ring gear shaft 126C. The second pathway goes through the second motor MG2 and the first motor MG1 to convert the mechanical energy to electrical energy and reconvert the electrical energy to mechanical energy, prior to the output to the ring gear shaft 126C. In this case, the energy circulation path as shown in FIG. 27 is not formed. In the schematic diagram of FIG. 28, the battery 194 is charged with part of the electrical energy Pm2 regenerated by the second motor MG2. Another possible process takes electrical energy out of the battery 194 and supplies the sum of the electrical energy from the battery 194 and the electrical energy Pm2 regenerated by the second motor MG2 to the first motor MG1.

As discussed above, the power output apparatus 110C of the second embodiment in which the second motor MG2 is disposed at a different position from that in the power output apparatus 110 of the first embodiment also enables the power output from the engine 150 to be subjected to torque conversion and eventually output to the ring gear shaft 126C. While the energy circulation path is formed under the regenerative control of the second motor MG2 in the structure of the first embodiment, the energy circulation path is formed under the power control of the second motor MG2 in the structure of the second embodiment. The torque control routine executed by the power output apparatus 110C of the second embodiment is thus basically similar to the torque control routine of FIG. 10 executed by the power output apparatus 110 of the first embodiment, except the determination at step S122 and some other modifications.

In the structure of the second embodiment, the second motor MG2 is required to carry out the regenerative operation, in order to prevent the undesirable energy circulation. The decision of step S122 in the flowchart of FIG. 10 is accordingly modified as 'Tm2*>Tref?' in order to determine whether or not the target engine torque Te* should be recalculated. The torque command value Tm2* of the second motor MG2 is calculated at step S118, and the threshold value Tref is set at step S120. When Tm2* is greater than Tref, that is, when the second motor MG2 carries out the power operation, the target engine torque Te* is reset at step S124. The preset threshold value Tref is a negative torque specified by the graph of FIG. 15 in the first embodiment. In the structure of the second embodiment, the threshold value of the torque is experimentally set to make the energy circulation within the allowable range. The map used for specifying the threshold value Tref in the second embodiment is substantially a positive-negative inversion of the map of FIG. 15.

Because of the different attachment position of the second motor MG2, the calculation of the torque command value Tm2* at step S118 is carried out according to Equation (18) given above with the torque command value Tr* and the target engine torque Te* instead of the torques Tr and Te. Some modification is also required in the map (see FIG. 15) used for setting the threshold value Tref at step S120. The target torque Te* of the engine 150 is recalculated at step S124 according to Equation (19) given below:

$$Te^* \leftarrow (1+\rho) \times Tr^* - Tref \qquad (19)$$

Figure 29:
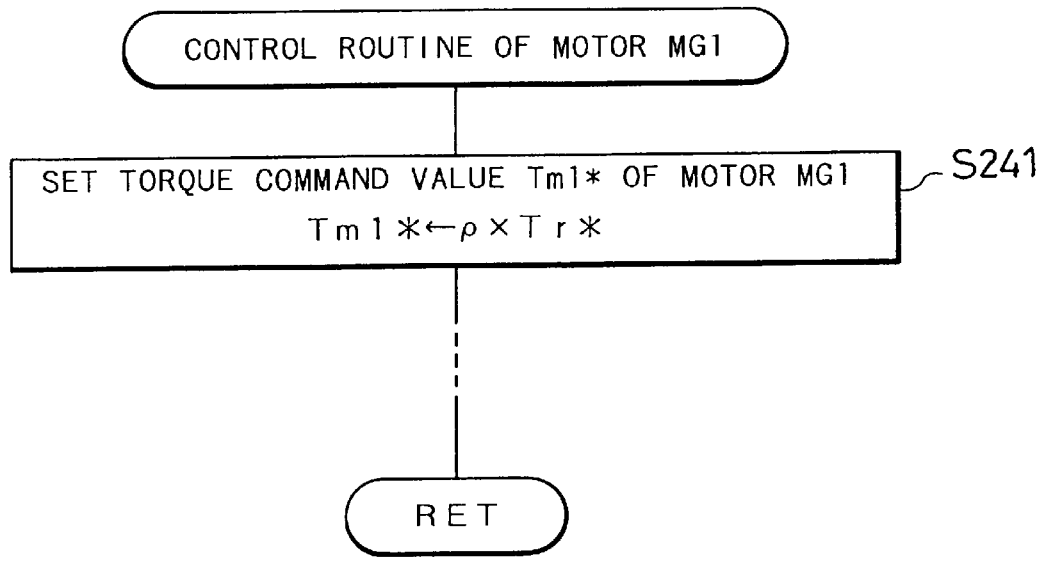
FIG. 29 is a flowchart showing part of a control routine of the first motor MG1 executed by the power output apparatus 110C of the second embodiment.
Figure 30:
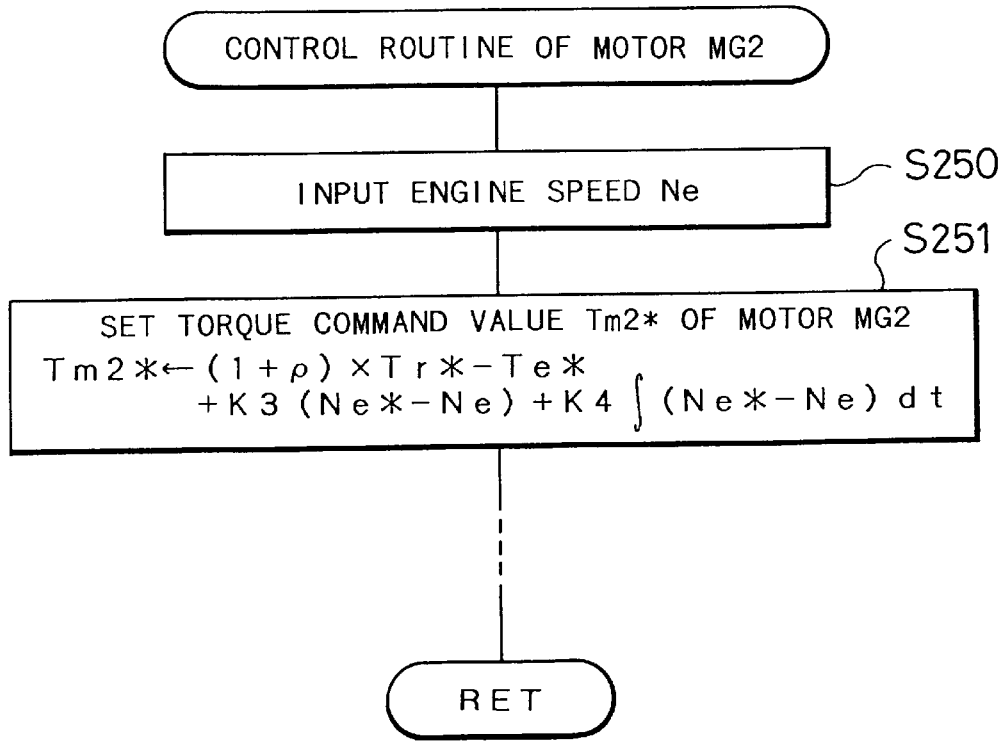
FIG. 30 is a flowchart showing part of a control routine of the second motor MG2 executed by the power output apparatus 110C of the second embodiment.

In the power output apparatus 110C of the second embodiment, the second motor MG2 is attached to the crankshaft 156. The processes of steps S140 and S141 in the control routine of the first motor MG1 shown in the flowchart of FIG. 17 are thus replaced by the process of step S241 in the control routine of the first motor MG1 shown in the flowchart of FIG. 29. At step S241, the control CPU 190 calculates the torque command value Tm1* of the first motor MG1 according to Equation (17) given above with the torque command value Tr* instead of the torque Tr. The process of step S150 in the control routine of the second motor MG2 in the flowchart of FIG. 18 is replaced by the processes of steps S250 and S251 in the control routine of the second motor MG2 shown in the flowchart of FIG. 30. The control CPU 190 reads the revolving speed Ne of the engine 150 at step S250 and calculates the torque command value Tm2* of the second motor MG2 from the input revolving speed Ne according to Equation (20) given below. The first term on the right side of Equation (20) is obtained from the equilibrium of forces on the dynamic collinear line in the nomograms of FIGS. 25 and 26. The second term on the right side is a proportional term to cancel the deviation of the actual engine speed Ne from the target engine speed Ne*, and the third term on the right side is an integral term to cancel the stationary deviation. In the stationary state (that is, when the deviation of the engine speed Ne from the target engine speed Ne* is equal to zero), the torque command value Tm2* of the second motor MG2 is set equal to the first term on the right side obtained from the equilibrium on the dynamic collinear line. K3 and K4 in Equation (20) denote proportional constants.

$$Tm2^* \leftarrow (1+\rho) \times Tr^* - Te^* + K3(Ne^* - Ne) + K4 \int (Ne^* - Ne)dt \qquad (20)$$

As discussed above, the power output apparatus 110C of the second embodiment ensures that the energy output to the ring gear shaft 126C via the form of electrical energy is within the allowable range. This increases the ratio of the energy of smaller loss that is directly output from the engine 150 to the ring gear shaft 126C via the planetary gear 120, thereby improving the energy efficiency of the whole apparatus. The structure of the embodiment sets the appropriate allowable range of energy output to the ring gear shaft 126C via the form of electrical energy, based on the revolving speed Nr of the ring gear shaft 126C.

In the power output apparatus 110C of the second embodiment, the threshold value Tref used for specifying the allowable range of energy output to the ring gear shaft 126C via the form of electrical energy is set, based on the revolving speed Nr of the ring gear shaft 126C. The allowable range of energy output to the ring gear shaft 126C via the form of electrical energy depends upon the efficiency of the whole power output apparatus 110C. The threshold value Tref may thus be set, based on a factor that affecting the efficiency of the whole power output apparatus 110C, for example, the efficiency of the driving point of the engine 150. The allowable range of energy output to the ring gear shaft 126C via the form of electrical energy is also varied with the energy Pe to be output from the engine 150. The threshold value Tref may thus be set, based on the charge-discharge energy Pb, which the battery 194 is charged with or which is discharged from the battery 194, or on the auxiliary machine-driving energy Ph required for driving auxiliary machines. Another possible procedure sets the threshold value Tref using these factors in a superposing manner.

Although the threshold value Tref used for specifying the allowable range of energy output to the ring gear shaft 126C via the form of electrical energy depends upon the revolving speed Nr of the ring gear shaft 126C in the power output apparatus 110C of the second embodiment, a fixed value may be set to the threshold value Tref, regardless of the revolving speed Nr of the ring gear shaft 126C. By way of example, the threshold value Tref may be set equal to zero. In this state, the second motor MG2 always functions as a motor. A motor that does not function as a generator but always works as a motor may accordingly be used as the second motor MG2.

The power output apparatus 110C of the second embodiment determines the energy Pe to be output from the engine 150 by taking into account the charge and discharge of the battery 194 and the energy required for driving the auxiliary machines. In the structure free of the charge or discharge of the battery 194 or in the structure without the auxiliary machines driven by the power output from the engine 150, however, the value obtained by dividing the energy Pr to be output to the ring gear shaft 126C by the efficiency ηt may be set as the energy Pe to be output from the engine 150.

When the target revolving speed Ne* and the target torque Te* of the engine 150 are reset, like the power output apparatus 110 of the first embodiment, the power output apparatus 110C of the second embodiment lags the open-close timing BT of the air intake valve 152 with an increase in revolving speed Ne of the engine 150, while keeping the position TVP of the throttle valve 166 unchanged, so as to change the driving point of the engine 150 on the constant energy curve Pe. Another possible procedure first controls the revolving speed Ne of the engine 150 to the target revolving speed Ne* and then regulates the open-close timing BT of the air intake valve 152, in order to enable the engine 150 to output the energy Pe. Still another possible procedure first controls the revolving speed Ne of the engine 150 to the target revolving speed Ne* and then regulates the position TVP of the throttle valve 166, in order to enable the engine 150 to output the energy Pe. In these modified structures, it is preferable that the open-close timing BT of the air intake valve 152 or the position TVP of the throttle valve 166 is subjected to feedback control with the torque Te of the engine 150 estimated by the torque command value Tm1* of the first motor MG1.

Figure 31:
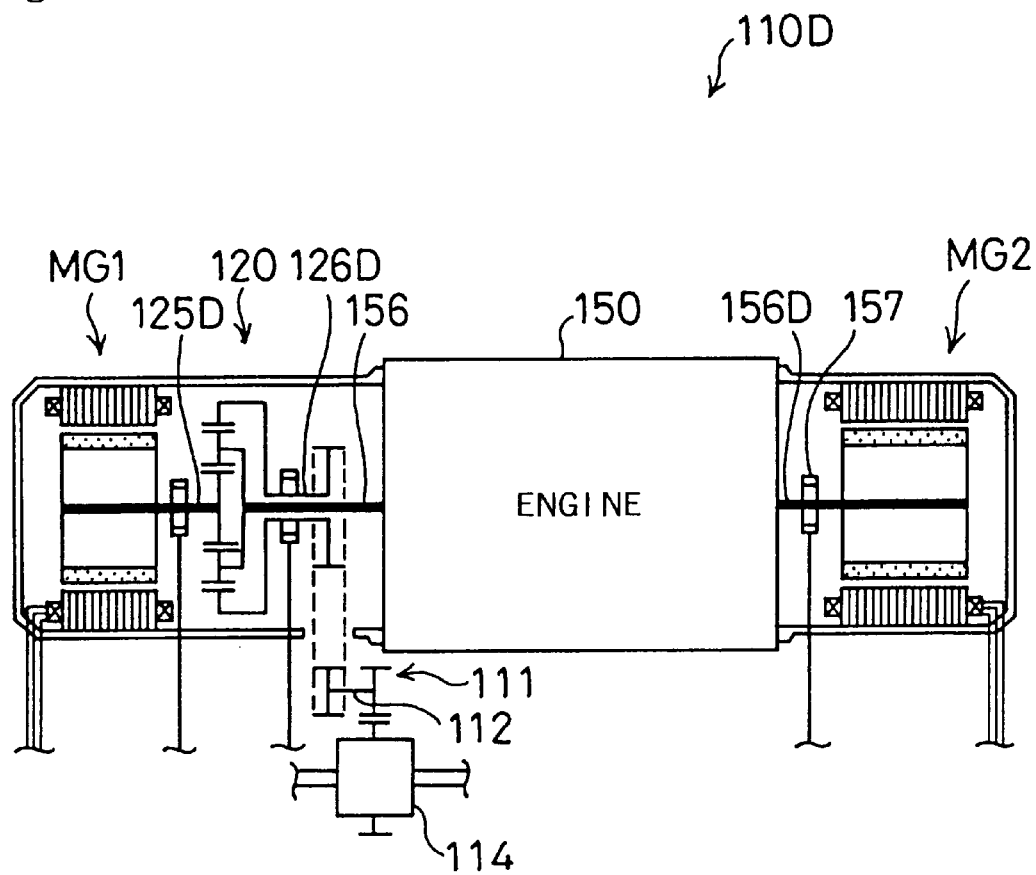
FIG. 31 schematically illustrates structure of another power output apparatus 110D as a modified example of the second embodiment.
Figure 32:
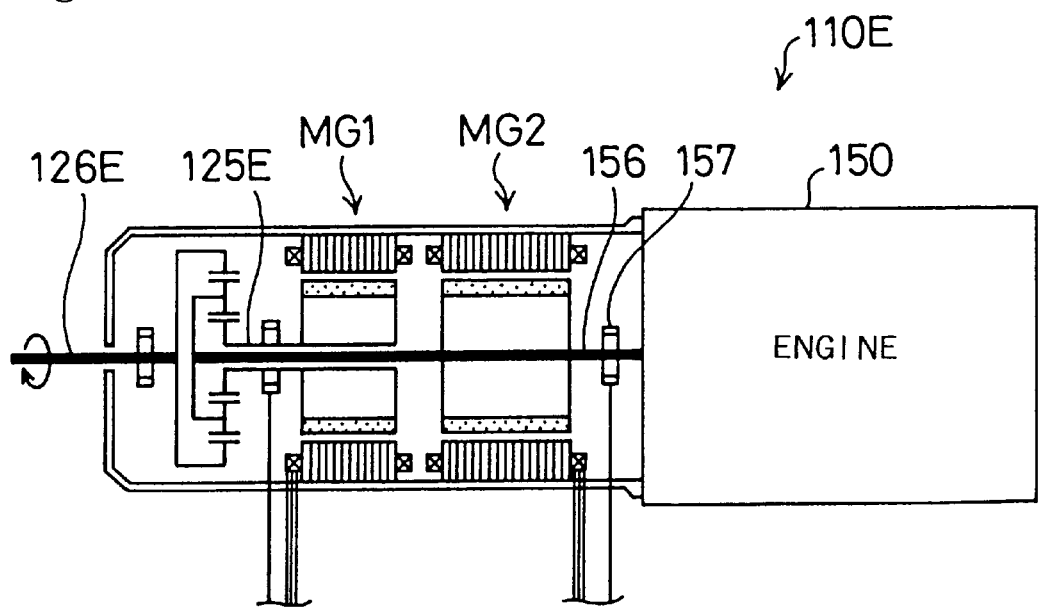
FIG. 32 schematically illustrates structure of still another power output apparatus 110E as another modified example of the second embodiment.

In the power output apparatus 110C of the second embodiment, the second motor MG2 is interposed between the engine 150 and the first motor MG1. Like another power output apparatus 110D given as a modified example in FIG. 31, however, the engine 150 may be interposed between the first motor MG1 and the second motor MG2. In the power output apparatus 110C of the second embodiment, the power output to the ring gear shaft 126C is taken out of the arrangement between the first motor MG1 and the second motor MG2 via the power feed gear 128 linked with the ring gear 122. Like still another power output apparatus 110E shown in FIG. 32 as another modified example, however, the power may be taken out of the casing 119, from which a ring gear shaft 126E is extended.

Figure 33:
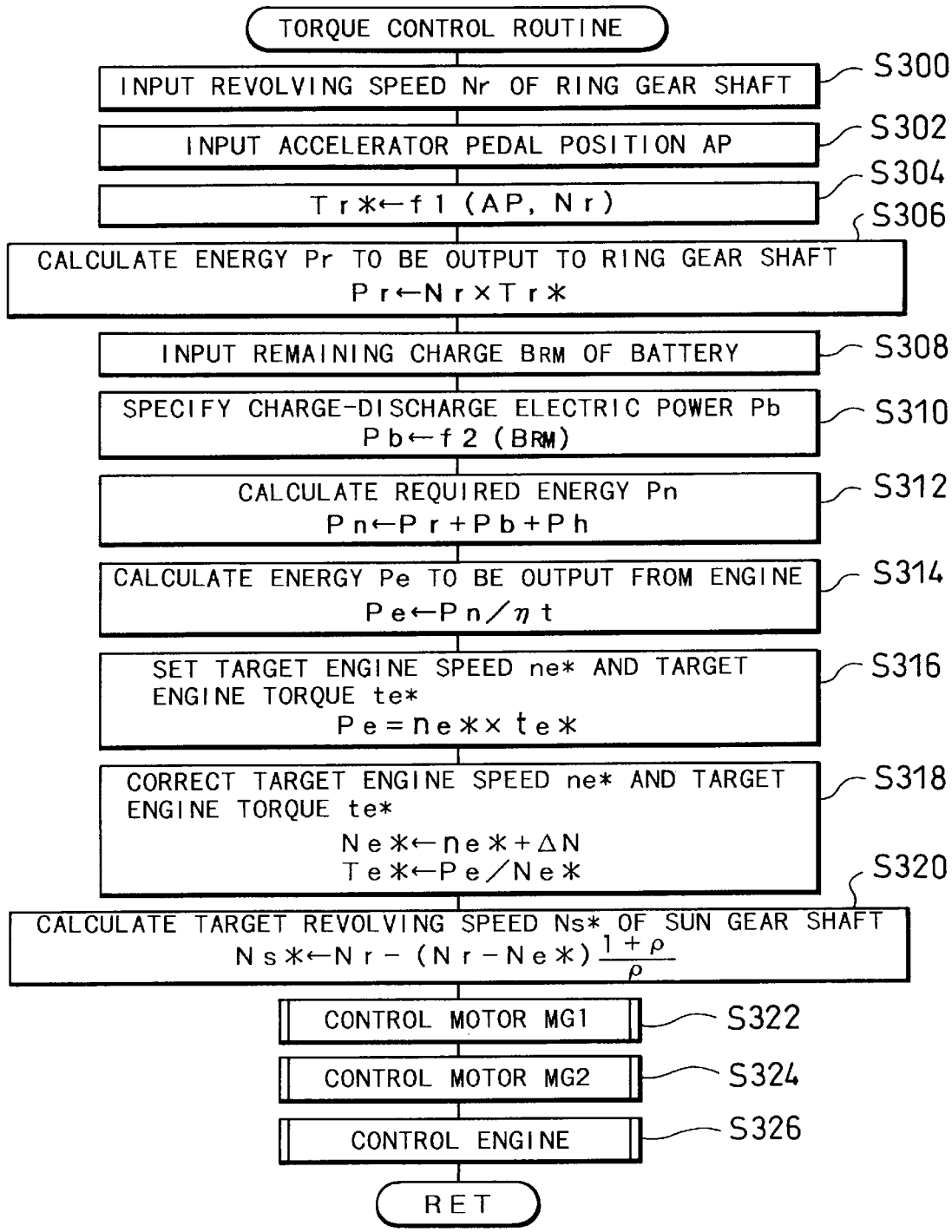
FIG. 33 is a flowchart showing a torque control routine executed by the controller 180 as a third embodiment according to the present invention.
Figure 34:
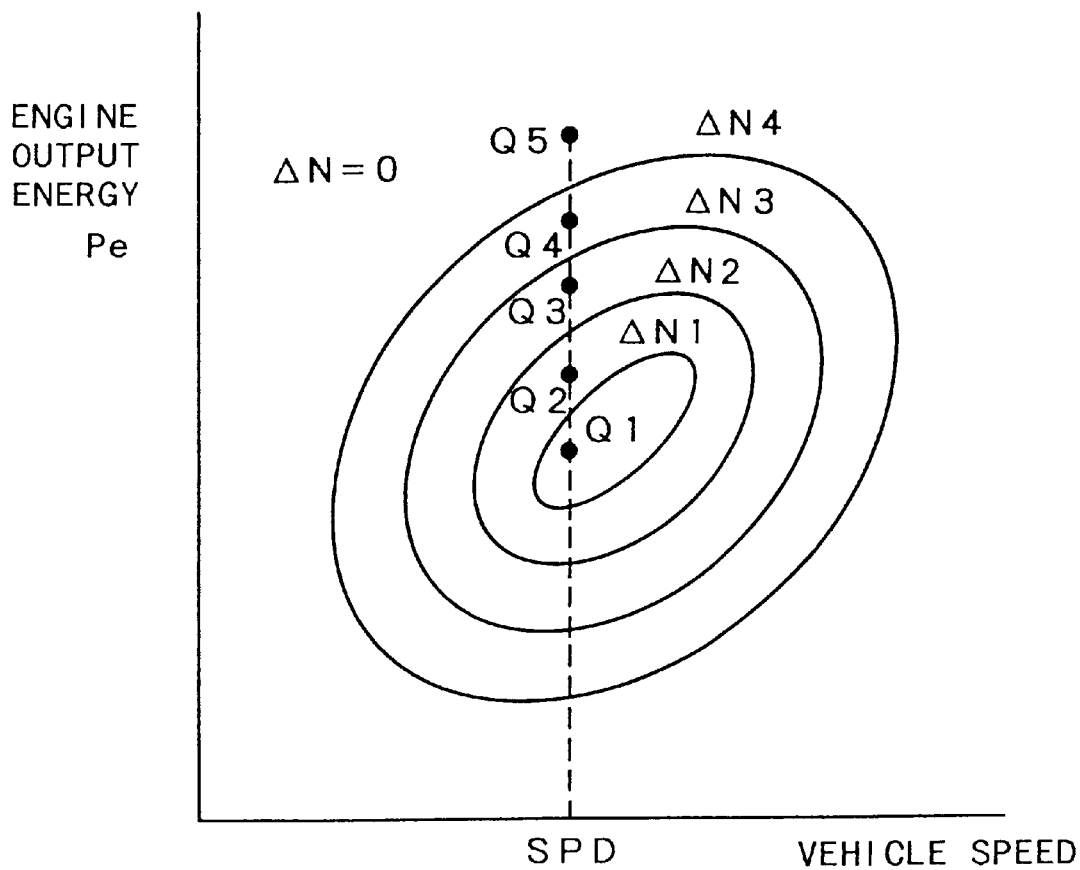
FIG. 34 is a graph showing corrections of target revolving speed ne* of the engine 150.

The following describes still another power output apparatus as a third embodiment according to the present invention based on the flowchart of FIG. 33 and the graph of FIG. 34. The power output apparatus of the third embodiment has the same hardware structure as that of the power output apparatus 110 of the first embodiment shown in FIGS. 1 through 3. The difference from the first embodiment is a torque control routine discussed below.

FIG. 33 is a flowchart showing the torque control routine executed in the third embodiment. Like the torque control routine of the first embodiment, this torque control routine is repeatedly executed by the control CPU 190 of the controller 180 at predetermined time intervals (for example, at every 48 msec) after the start of the power output apparatus.

When the program enters the torque control routine of FIG. 33, the control CPU 190 first reads the revolving speed Nr of the ring gear shaft 126 and the accelerator pedal position AP at steps S300 and S302, and determines the torque command value Tr* or the target torque to be output to the ring gear shaft 126 based on these input values at step S304. The energy Pr to be output to the ring gear shaft 126 is calculated at step S306 as the product of the torque command value Tr* and the revolving speed Nr of the ring gear shaft 126.

The control CPU 190 then reads the remaining charge BRM of the battery 194 at step S308, and determines the electric power Pb, which the battery 194 is charged with or which is discharged from the battery 194, based on the input remaining charge BRM at step S310. The required energy Pn is calculated at step S312 as the sum of the electric power Pb, the energy Pr to be output to the ring gear shaft 126 calculated at step S306, and energy Ph required for driving a variety of auxiliary machines. The energy Pe to be output from the engine 150 is subsequently calculated by dividing the required energy Pn by the efficiency ηt of torque conversion at step S314. These steps are identical with those of the torque control routine (FIG. 10) executed in the first embodiment.

The control CPU 190 sets a target revolving speed ne* and a target torque te* of the engine 150 at step S316. The structure of the first embodiment utilizes the working curve A shown in FIG. 13 as the map and specifies the revolving speed and the torque that enable the engine 150 to be driven at the highest possible efficiency as the target revolving speed Ne* and the target torque Te*. The structure of the third embodiment adopts the method of the first embodiment to set the target revolving speed ne* and the target torque te*. At subsequent step S318, the control CPU 190 calculates a final target revolving speed Ne* by adding a correction ΔN of revolving speed obtained from the map of FIG. 34 to the target revolving speed ne*, and also computes a final target torque Te* by dividing the energy Pe to be output from the engine 150 by the final target revolving speed Ne* thus calculated. The following describes the details of the calculation of the final target revolving speed Ne*.

When the power state that enables the engine 150 to be driven at the highest possible efficiency is set as the target revolving speed ne* and the target torque te* and the torque command value Tm2* of the second motor MG2 is calculated from these values, the energy circulation out of the allowable range may occur as discussed in the torque control routine of the first embodiment. The structure of the first embodiment determines whether or not such energy circulation occurs based on the torque command value Tm2* of the second motor MG2 and carries out a kind of feedback control to correct the target revolving speed Ne* and the target torque Te* of the engine 150 if such energy circulation occurs (see steps S122, S124, and S126 in the flowchart of FIG. 10).

The correction ΔN of the target revolving speed ne* of the engine 150 can be calculated even when the power output apparatus is not in the driving state. The operations of steps S116 through S126 in the flowchart of FIG. 10 are carried out to calculate the correction ΔN using the calculated energy Pe to be output from the engine 150 and the input revolving speed Nr of the ring gear shaft 126. The correction ΔN of the revolving speed of the engine 150 can be obtained in advance in the form of a map by carrying out these operations with respect to various values of the energy Pe and the revolving speed Nr. FIG. 34 shows such a map as an example. In the graph of FIG. 34, the correction ΔN of the target revolving speed ne* of the engine 150 is defined by the vehicle speed as abscissa and the engine output energy Pe as ordinate. Since the driving wheels 116 and 118 are mechanically linked with the ring gear shaft 126 and the vehicle speed or the revolving speed of the driving wheels 116 and 118 is equivalent to the revolving speed Nr of the ring gear shaft 126, the revolving speed Nr may be used as abscissa.

Here it is assumed that the vehicle speed is SPD. The graph of FIG. 34 shows that the target revolving speed ne* of the engine 150 is to be increased by ΔN1 when the vehicle speed SPD and the engine output energy Pe corresponding to a point Q1 are required. In case that the engine 150 is driven at the target revolving speed ne* and the target torque te* obtained from the working curve A of FIG. 13 while outputting the energy Pe corresponding to the point Q1, the decreased torque command value Tm2* of the second motor MG2 causes an undesirable energy circulation. It is accordingly required that the value obtained by increasing the target revolving speed ne* by ΔN1 is set as the final target revolving speed Ne* of the engine 150.

The meaning of the correction ΔN1 is discussed with the graph of FIG. 16. In order to enable the engine 150 to be driven at the highest possible efficiency, a driving point on the working curve A in FIG. 16 is selected with respect to the energy Pe to be output from the engine 150. Namely the engine 150 is driven at a point P3 defined by a revolving speed Ne3 and a torque Te3 for that purpose. It is assumed that an energy circulation occurs when the engine 150 is driven at the point P3 and an increase in revolving speed Ne of the engine 150 to a value Ne4 is required to keep the energy circulation within the allowable range. Since the energy Pe to be output from the engine 150 is constant, the output torque of the engine 150 decreases to a value Te4 as shown in FIG. 16. On the assumption that the point Q1 in FIG. 34 corresponds to this state, the correction ΔN1 of the revolving speed in FIG. 34 is expressed as (Ne4−Ne3) in FIG. 16.

In this manner, the correction ΔN of the revolving speed of the engine 150 can be obtained from the map of FIG. 34; for example, the correction ΔN of the revolving speed is equal to ΔN2 when the engine 150 is driven at a point Q2 in FIG. 34, and is equal to ΔN3 when the engine 150 is driven at a point Q3. In the third embodiment, these corrections satisfy the relation of ΔN1>ΔN2>. . . . When the engine 150 is driven at a point Q5, the correction ΔN of the revolving speed of the engine 150 is equal to zero. This means that the engine 150 should be driven at the revolving speed obtained from the working curve A of FIG. 13 in this state.

The map of FIG. 34 used in the third embodiment is prepared by taking into account the working efficiency of the whole power output apparatus as well as the energy circulation. In the map of FIG. 34, the correction ΔN of the revolving speed of the engine 150 decreases with a decrease in engine output energy Pe from the value of the point Q1. This is because the smaller engine output energy reduces the loss due to the energy circulation and driving the engine 150 at a driving point of better efficiency is preferable from the viewpoint of the working efficiency of the whole power output apparatus. Even in the case of small engine output energy, however, the map for increasing the revolving speed of the engine 150 may be used to completely cancel the energy circulation.

In the map of FIG. 34, the correction ΔN of the revolving speed of the engine 150 varies stepwise from ΔN1 to ΔN4. The correction ΔN may vary in a binary manner between 0 and ΔN1 or almost continuously vary in a greater number of steps. The map may give the target revolving speed Ne* of the engine 150 or alternatively the correction of the torque or the target torque Te*, instead of the correction ΔN of the revolving speed. In the third embodiment, the map is stored in the ROM 190*b* of the control CPU 190, and gives the corrections of the revolving speed of the engine 150 corresponding to several combinations of discrete values of the vehicle speed and the engine output energy.

Referring back to the torque control routine of FIG. 33, after setting the target revolving speed Ne* and the target torque Te* of the engine 150 at step S318, the control CPU 190 calculates the target revolving speed Ns* of the sun gear shaft 125 at step S320. The processing of these steps is identical with the processing of steps S120 and S128 in the torque control routine of the first embodiment shown in the flowchart of FIG. 10. The structure of the third embodiment sets the target revolving speed Ne* and the target torque Te* of the engine 150 at step S318, based on the map of FIG. 34 that gives the correction of the revolving speed of the engine 150 not to cause an energy circulation. The third embodiment accordingly does not require the feedback control carried out in the torque control routine of the first embodiment for correcting the target revolving speed Ne* and the target torque Te* of the engine 150 according to the torque command value Tm2* of the second motor MG2 (steps S122, S124, and S126 in the flowchart of FIG. 10).

The control CPU 190 then controls the fist motor MG1, the second motor MG2, and the engine 150 with the preset values at steps S322, S324, and S326. The processing of these steps is identical with the processing of steps S130, S132, and S134 in the torque control routine of the first embodiment.

The power output apparatus of the third embodiment feed-forward controls the operations of the engine 150, the first motor MG1, and the second motor MG2 with the map of FIG. 34, thereby enabling the power to be output to the ring gear shaft 126 without causing an energy circulation. Another advantage of the third embodiment is to attain the smooth control of the power output apparatus. The torque control routine of the first embodiment carries out the feedback control according to the torque command value Tm2* of the second motor MG2. The torque command value Tm2* is based on the accelerator pedal position AP and other factors and thereby varies frequently or even abruptly. The structure of the third embodiment, on the other hand, adopts the feed-forward control based on the vehicle speed that changes in a relatively gentle manner, thereby gently changing the driving state of the engine 150. This structure thus enables the smooth control of the power output apparatus as a whole.

The map of FIG. 34 provided by taking into account the working efficiencies of the engine 150, the first motor MG1, and the second motor MG2 is used in the feed-forward control. The production errors and other factors vary the working efficiencies of the individual engines 150 and the motors MG1 and MG2. An ideal process accordingly measures the working efficiencies of the respective power-driven apparatuses and provides individual maps. But this is extremely difficult and unpractical. The practical process applies the map provided at a specific working efficiency for each power-driven apparatus. Since the scatter of the working efficiency due to the production factors is relatively small, this process can sufficiently prevent the energy circulation.

In order to prevent the effect of scattering, one preferable structure monitors the driving state of the power output apparatus and corrects the map based on the results of monitoring. A concrete procedure of this structure feedback controls the driving state of the engine 150 to prevent the torque command value Tm2* of the second motor MG2 from exceeding a predetermined threshold value Tref, while driving the engine 150 in the state read from the map in the torque control routine. Execution of the feedback control implies that the values read from the map are inappropriate. The values in the map are accordingly rewritten, based on the revolving speed of the engine 150 after the feedback control. This learning function prevents the effect of scattering on the operation of the power output apparatus.

The torque control routine of the third embodiment may be applied to the power output apparatus having the hardware structure of the second embodiment shown in FIG. 24. As discussed in the second embodiment, regeneration of energy by the second motor MG2 and increase in output torque of the engine 150 are required to prevent the recirculation of energy. In other words, it is required that the target revolving speed Ne* of the engine 150 is set lower than the revolving speed ne* read from the working curve A of FIG. 13. In this structure, the difference from the third embodiment is that the corrections ΔN1 through ΔN4 in the map of FIG. 34 are negative values.

Figure 35:
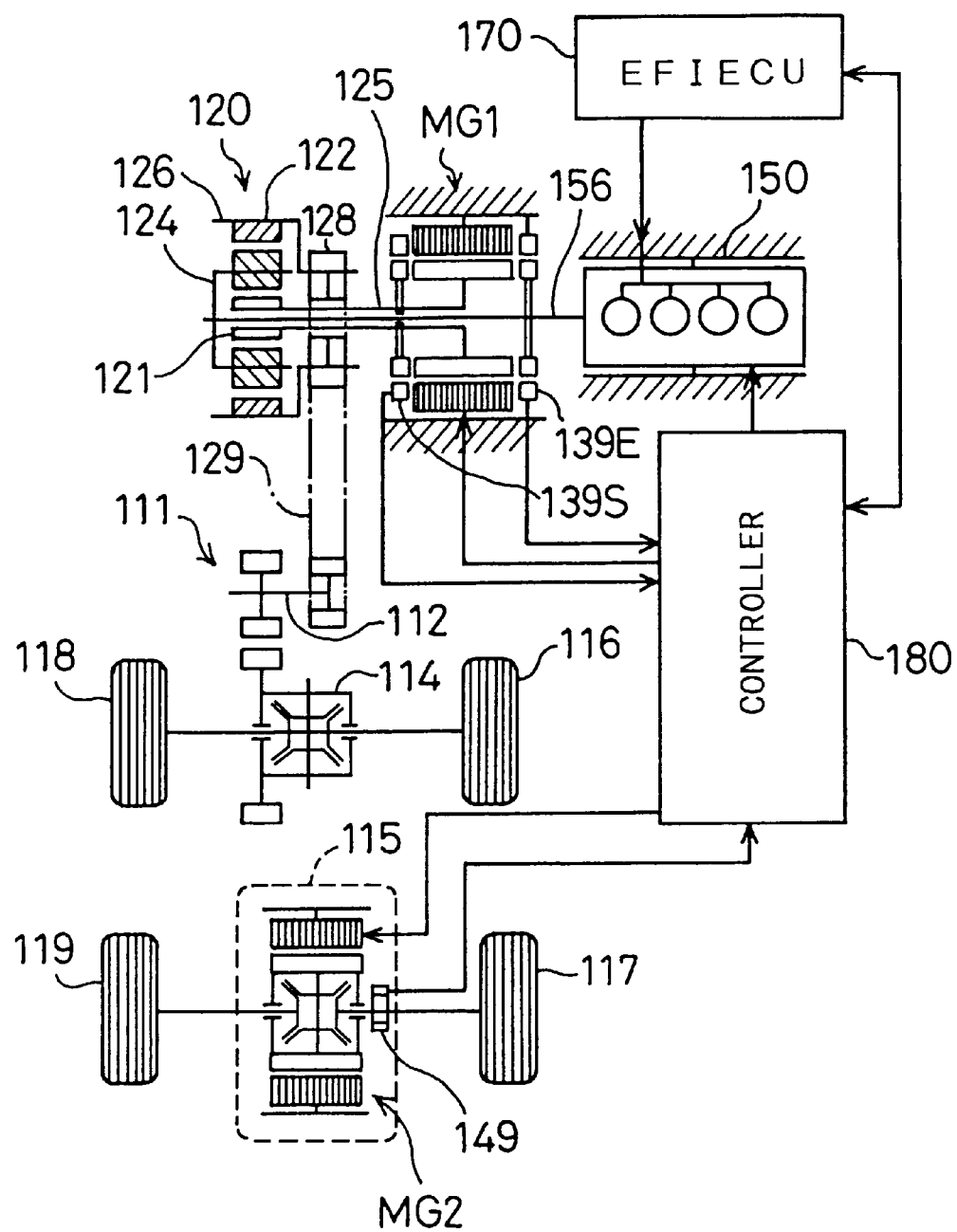
FIG. 35 schematically illustrates structure of a four-wheel-drive vehicle with a power output apparatus 110F, which is equivalent to the power output apparatus 110 of the first embodiment.

The power output apparatus 110 of the first embodiment, the power output apparatus 110C of the second embodiment, and their modified examples discussed above are applied to the FR-type or FF-type two-wheel-drive vehicle. In another modified example, however, a power output apparatus 110F may be applied to a four-wheel-drive vehicle as shown in FIG. 35. In this structure, the second motor MG2 is separated from the ring gear shaft 126 and independently arranged in the rear-wheel portion of the vehicle, so as to drive the rear driving wheels 117 and 119. The ring gear shaft 126 is, on the other hand, connected to the differential gear 114 via the power feed gear 128 and the power transmission gear 111, in order to drive the front driving wheels 116 and 118. The torque control routine of FIG. 10 is applicable with some modification to this structure.

The present invention is not restricted to the above embodiments or its modified examples, but there may be many modifications, changes, and alterations without departing from the scope or spirit of the main characteristics of the present invention.

Although the gasoline engine is used as the engine 150 in the above embodiments, the principle of the present invention is also applicable to other internal combustion engines and external combustion engines, such as Diesel engines, turbine engines, and jet engines.

In the above embodiments, the planetary gear 120 is used as the three shaft-type power input/output means. Another available example is a double-pinion planetary gear having plural sets of planetary pinion gears. One planetary pinion gear in each pair is linked with the sun gear while the other is linked with the ring gear, and the pair of planetary pinion gears are linked with each other to revolve around the sun gear while rotating on its axis. Any other device or gear unit, such as a differential gear, is also applicable for the three shaft-type power input/output means, as long as it can determine powers input to and output from the residual one shaft based on predetermined powers input to and output from any two shafts among the three shafts. The principle of the present invention is also applicable to an electrical distribution-type power output apparatus, which uses a clutch motor instead of the power regulation means including the three shaft-type power input/output means and the generator. Structure of the electrical distribution-type power output apparatus is disclosed in, for example, JAPANESE PATENT LAYING-OPEN GAZETTE No. 9-47011.

Permanent magnet (PM)-type synchronous motors are used as the first motor MG1 and the second motor MG2 in the embodiments discussed above. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the first and the second driving circuits 191 and 192 in the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 in the above embodiments may include Pb cells, NiMH cells, Li cells, or the like cells. A capacitor may be used in place of the battery 194.

Although the power output apparatus is mounted on the vehicle in all the above embodiments, it may be mounted on other transportation means like ships and airplanes as well as a variety of industrial machines.

It should be clearly understood that the above embodiments are only illustrative and not restrictive in any sense. The scope and spirit of the present invention are limited only by the terms of the appended claims.

What is claimed is:

1. A power output apparatus for outputting power to a drive shaft, said power output apparatus comprising:

an engine having an output shaft linked therewith;

power regulation means connected with said output shaft and said drive shaft for transmitting power output from said engine to said drive shaft and regulating magnitude of the transmitted power through transformation of electric power;

a motor linked with said drive shaft for receiving and transmitting power from and to said drive shaft;

drive-shaft target power state setting means for setting a revolving speed of said drive shaft and a torque output to said drive shaft as a target power state of said drive shaft;

engine target power state setting means for setting a revolving speed of said engine and a torque to be output from said engine as a target power state of said engine, based on the target power state of said drive shaft and a working efficiency of said engine; and control means for controlling said motor and said power regulation means, in order to enable the target power state of said engine to be converted to the target power state of said drive shaft and output to said dive shaft, and driving said engine in a power state that enables an output torque of said motor to be not less than a predetermined torque during the control of said motor and said power regulation means.

2. A power output apparatus in accordance with claim 1, wherein said predetermined torque depends upon the revolving speed of said drive shaft.

3. A power output apparatus in accordance with claim 1, wherein said predetermined torque depends upon an efficiency of said engine.

4. A power output apparatus in accordance with claim 1, said power output apparatus further comprising:

storage battery means electrically connected with said power regulation means and said motor, said storage battery means being capable of being charged with and discharging at least part of the electric power regulated by said power regulation means and at least part of electric power required for the power input and output by said motor, target electric power setting means for setting a target electric power, which said storage battery means is charged with and which is discharged from said storage battery means; and an auxiliary machine driven by the power output from end engine as a power source, wherein said engine target power state setting means sets the target power state of said engine, based on the target power state of said drive shaft, the target electric power, and power required for driving said auxiliary machine, said predetermined torque depending upon the target electric power and the power required for driving said auxiliary machine.

5. A power output apparatus in accordance with claim 1, wherein said power regulation means comprises:

three shaft-type power input/output means having a first rotating shaft connected with said output shaft, a second rotating shaft connected with said drive shaft, and a third rotating shaft which are different from said first rotating shaft and said second rotating shaft, said three shaft-type power input/output means determining a power state of a residual one rotating shaft, based on predetermined power state of any two rotating shafts among said three rotating shafts; and a second motor linked with said third rotating shaft for receiving and transmitting power from and to said third rotating shaft.

6. A power output apparatus in accordance with claim 1, said power output apparatus further comprising:

storage battery means electrically connected with said power regulation means and said motor, said storage battery means being capable of being charged with and discharging at least part of the electric power regulated by said power regulation means and at least part of electric power required for the power input and output by said motor, wherein said control means comprises power control means and engine target power state correcting means, said power control means enabling said engine to be driven in the target power state of said engine, regulating the power output from said engine as well as the electric power, which said storage battery means is charged with and which is discharged from said storage battery means, and controlling said motor and said power regulation means in order to enable the revolving speed of said drive shaft and the torque output to said drive shaft to coincide with the target power state of said drive shaft, said engine target power state correcting means correcting the target power state of said engine used by said power control means, so as to enable said motor to be driven with a torque of not less than said predetermined torque, when said motor is driven with a torque of less than said predetermined torque through the control of said power control means.

7. A power output apparatus in accordance with claim 6, wherein said engine target power state correcting means corrects the target power state of said engine to a power state having an identical power but a greater revolving speed.

8. A power output apparatus in accordance with claim 7, said power output apparatus further comprising:

shift control means for, when said engine target power state correcting means corrects the target power state of said engine, controlling said engine, said motor, and said power regulation means, in order to enable a driving state of said engine to approach the corrected target power state of said engine, while keeping the power output from said engine substantially unchanged.

9. A power output apparatus in accordance with claim 8, wherein said engine is an internal combustion engine having an air intake conduit and an air intake valve, said internal combustion engine comprising opening area variation means for varying an opening area of said air intake conduit and open-close timing change means for changing an open-close timing of said air intake valve, said shift control means gradually changing the open-close timing of said air intake valve and the electric power regulated by said power regulation means, while keeping the opening area of said air intake conduit at a predetermined value, so as to enable the driving state of said engine to approach the corrected target power state of said engine.

10. A power output apparatus in accordance with claim 7, said power output apparatus further comprising:

shift control means for, when said engine target power state correcting means corrects the target power state of said engine, controlling said engine, said motor, and said power regulation means, in order to shift a driving state of said engine gradually to the corrected target power state of said engine by giving a preference to the revolving speed over the torque.

11. A power output apparatus in accordance with claim 10, wherein said engine is an internal combustion engine having an air intake conduit, said internal combustion engine comprising an opening area variation means for varying an opening area of said air intake conduit, said shift control means comprising:

revolving speed shifting means for varying the electric power regulated by said power regulation means, so as to shift the revolving speed of said engine gradually to a revolving speed corresponding to the corrected target power state of said engine; and torque shifting means for regulating the opening area of said air intake conduit, so as to enable said engine to output a torque corresponding to the corrected target power state of said engine, in response to the shift of the revolving speed of said engine by said revolving speed shifting means.

12. A power output apparatus in accordance with claim 10, wherein said engine is an internal combustion engine having an air intake conduit and an air in take valve, said internal combustion engine comprising open-close timing change means for changing an open-close timing of said air intake valve, said shift control means comprising:

revolving speed shifting means for varying the electric power regulated by said power regulation means, so as to shift the revolving speed of said engine gradually to a revolving speed corresponding to the corrected target power state of said engine; and torque shifting means for regulating the open-close timing of said air intake valve, so as to enable said engine to output a torque corresponding to the corrected target power state of said engine, in response to the shift of the revolving speed of said engine by said revolving speed shifting means.

13. A power output apparatus for outputting power to a drive shaft, said power output apparatus comprising:

an engine having an output shaft linked therewith;

power regulation means connected with said output shaft and said drive shaft for transmitting power output from said engine to said drive shaft and regulating magnitude of the transmitted power through transformation of electric power;

a motor linked with said drive shaft for receiving and transmitting power from and to said drive shaft;

drive-shaft target power state setting means for setting a revolving speed of said drive shaft and a torque output to said drive shaft as a target power state of said drive shaft;

memory means for storing a relationship between the revolving speed of said drive shaft, the power output from said engine, and a power state of said engine that enables said motor to be driven with a torque of not less than a predetermined torque;

revolving speed input means for inputting the revolving speed of said drive shaft;

engine target power state setting means for setting the power state of said engine obtained by referring to the relationship stored in said memory means as a target power state of said engine, based on a power to be output from said engine, which is set based on the target power state of said drive shaft, and the input revolving speed of said drive shaft; and control means for controlling said engine to be driven in the target power state of said engine, and controlling said motor and said power regulation means, so as to enable the power state of said engine to be converted to the target power state of said drive shaft and output to said drive shaft.

14. A power output apparatus in accordance with claim 13, wherein said predetermined torque depends upon the revolving speed of said drive shaft.

15. A power output apparatus in accordance with claim 13, wherein said predetermined torque depends upon an efficiency of said engine.

16. A power output apparatus in accordance with claim 13, said power output apparatus further comprising:

storage battery means electrically connected with said power regulation means and said motor, said storage battery means being capable of being charged with and discharging at least part of the electric power regulated by said power regulation means and at least part of electric power required for the power input and output by said motor, target electric power setting means for setting a target electric power, which said storage battery means is charged with and which is discharged from said storage battery means; and an auxiliary machine driven by the power output from end engine as a power source, wherein said engine target power state setting means sets the target power state of said engine, based on the target power state of said drive shaft, the target electric power, and power required for driving said auxiliary machine, said predetermined torque depending upon the target electric power and the power required for driving said auxiliary machine.

17. A power output apparatus in accordance with claim 13, wherein said power regulation means comprises:

three shaft-type power input/output means having a first rotating shaft connected with said output shaft, a second rotating shaft connected with said drive shaft, and a third rotating shaft which are different from said first rotating shaft and said second rotating shaft, said three shaft-type power input/output means determining a power state of a residual one rotating shaft, based on predetermined power state of any two rotating shafts among said three rotating shafts; and a second motor linked with said third rotating shaft for receiving and transmitting power from and to said third rotating shaft.

18. A power output apparatus for outputting power to a drive shaft, said power output apparatus comprising:

an engine having an output shaft linked therewith;

power regulation means connected with said output shaft and said drive shaft for transmitting power output from said engine to said drive shaft and regulating magnitude of the transmitted power through transformation of electric power;

a motor linked with said output shaft for receiving and transmitting power from and to said output shaft;

drive-shaft target power state setting means for setting a revolving speed of said drive shaft and a torque output to said drive shaft as a target power state of said drive shaft;

engine target power state setting means for setting a revolving speed of said engine and a torque to be output from said engine as a target power state of said engine, based on the target power state of said drive shaft and a working efficiency of said engine; and control means for controlling said motor and said power regulation means, in order to enable the target power state of said engine to be converted to the target power state of said drive shaft and output to said drive shaft, and driving said engine in a power state that enables an output torque of said motor to be not greater than a predetermined torque during the control of said motor and said power regulation means.

19. A power output apparatus in accordance with claim 18, wherein said predetermined torque depends upon the revolving speed of said drive shaft.

20. A power output apparatus in accordance with claim 18, wherein said predetermined torque depends upon an efficiency of said engine.

21. A power output apparatus in accordance with claim 18, said power output apparatus further comprising:

storage battery means electrically connected with said power regulation means and said motor, said storage battery means being capable of being charged with and discharging at least part of the electric power regulated by said power regulation means and at least part of electric power required for the power input and output by said motor, target electric power setting means for setting a target electric power, which said storage battery means is charged with and which is discharged from said storage battery means; and an auxiliary machine driven by the power output from end engine as a power source, wherein said engine target power state setting means sets the target power state of said engine, based on the target power state of said drive shaft, the target electric power, and power required for driving said auxiliary machine, said predetermined torque depending upon the target electric power and the power required for driving said auxiliary machine.

22. A power output apparatus in accordance with claim 18, wherein said power regulation means comprises:

three shaft-type power input/output means having a first rotating shaft connected with said output shaft, a second rotating shaft connected with said drive shaft, and a third rotating shaft which are different from said first rotating shaft and said second rotating shaft, said three shaft-type power input/output means determining a power state of a residual one rotating shaft, based on predetermined power state of any two rotating shafts among said three rotating shafts; and a second motor linked with said third rotating shaft for receiving and transmitting power from and to said third rotating shaft.

23. A power output apparatus in accordance with claim 18, said power output apparatus further comprising:

storage battery means electrically connected with said power regulation means and said motor, said storage battery means being capable of being charged with and discharging at least part of the electric power regulated by said power regulation means and at least part of electric power required for the power input and output by said motor, wherein said control means comprises power control means and engine target power state correcting means, said power control means enabling said engine to be driven in the target power state of said engine, regulating the power output from said engine as well as the electric power, which said storage battery means is charged with and which is discharged from said storage battery means, and controlling said motor and said power regulation means in order to enable the revolving speed of said drive shaft and the torque output to said drive shaft to coincide with the target power state of said drive shaft, said engine target power state correcting means correcting the target power state of said engine used by said power control means, so as to enable said motor to be driven with a torque of not greater than said predetermined torque, when said motor is driven with a torque of greater than said predetermined torque through the control of said power control means.

24. A power output apparatus in accordance with claim 23, wherein said engine target power state correcting means corrects the target power state of said engine to a power state having an identical power but a less revolving speed.

25. A power output apparatus for outputting power to a drive shaft, said power output apparatus comprising:

an engine having an output shaft linked therewith;

power regulation means connected with said output shaft and said drive shaft for transmitting power output from said engine to said drive shaft and regulating magnitude of the transmitted power through transmission of electric power;

a motor linked with said output shaft for receiving and transmitting power from and to said output shaft;

drive-shaft target power state setting means for setting a revolving speed of said drive shaft and a torque output to said drive shaft as a target power state of said drive shaft;

memory means for storing a relationship between the revolving speed of said drive shaft, the power output from said engine, and a power state of said engine that enables said motor to be driven with a torque of not greater than a predetermined torque;

revolving speed input means for inputting the revolving speed of said drive shaft;

engine target power state setting means for setting the power state of said engine obtained by referring to the relationship stored in said memory means as a target power state of said engine, based on a power to be output from said engine, which is set based on the target power state of said drive shaft, and the input revolving speed of said drive shaft; and control means for controlling said engine to be driven in the target power state of said engine, and controlling said motor and said power regulation means, so as to enable the power state of said engine to be converted to the target power state of said drive shaft and output to said drive shaft.

26. A power output apparatus in accordance with claim 25, wherein said predetermined torque depends upon the revolving speed of said drive shaft.

27. A power output apparatus in accordance with claim 25, wherein said predetermined torque depends upon an efficiency of said engine.

28. A power output apparatus in accordance with claim 25, said power output apparatus further comprising:

storage battery means electrically connected with said power regulation means and said motor, said storage battery means being capable of being charged with and discharging at least part of the electric power regulated by said power regulation means and at least part of electric power required for the power input and output by said motor, target electric power setting means for setting a target electric power, which said storage battery means is charged with and which is discharged from said storage battery means; and an auxiliary machine driven by the power output from end engine as a power source, wherein said engine target power state setting means sets the target power state of said engine, based on the target power state of said drive shaft, the target electric power, and power required for driving said auxiliary machine, said predetermined torque depending upon the target electric power and the power required for driving said auxiliary machine.

29. A power output apparatus in accordance with claim 25, wherein said power regulation means comprises:

three shaft-type power input/output means having a first rotating shaft connected with said output shaft, a second rotating shaft connected with said drive shaft, and a third rotating shaft which are different from said first rotating shaft and said second rotating shaft, said three shaft-type power input/output means determining a power state of a residual one rotating shaft, based on predetermined power state of any two rotating shafts among said three rotating shafts; and a second motor linked with said third rotating shaft for receiving and transmitting power from and to said third rotating shaft.

30. A method of controlling a power output apparatus for outputting power to a drive shaft, said power output apparatus comprising: an engine having an output shaft; power regulation means connected with said output shaft of said engine and said drive shaft for transmitting power output from said engine to said drive shaft and regulating magnitude of the transmitted power through transformation of electric power; and a motor for receiving and transmitting power from and to said drive shaft, said method comprising the steps of:

(a) setting a revolving speed of said drive shaft and a torque output to said drive shaft as a target power state of said drive shaft;

(b) setting a revolving speed of said engine and a torque to be output from said engine as a target power state of said engine, based on the target power state of said drive shaft and a working efficiency of said engine; and (c) controlling said motor and said power regulation means, in order to enable the target power state of said engine to be converted to the target power state of said drive shaft and output to said drive shaft, and driving said engine in a power state that enables an output torque of said motor to be not less than a predetermined torque during the control of said motor and said power regulation means.

31. A method in accordance with claim 30, wherein said power output apparatus further comprises:

storage battery means being capable of being charged with and discharging at least part of the electric power regulated by said power regulation means and at least part of electric power required for the power input and output by said motor, said step (c) comprising the steps of:

(c1) enabling said engine to be driven in the target power state of said engine, converting the power output from said engine as well as the electric power, which said storage battery means is charged with and which is discharged from said storage battery means, and controlling said motor and said power regulation means in order to enable the power output to said drive shaft to coincide with the target power state of said drive shaft, (c2) correcting the target power state of said engine used in said step (c1), so as to enable said motor to be driven with a torque of not less than said predetermined torque, when said motor is driven with a torque of less than said predetermined torque through the control of said step (c1).

32. A method of controlling a power output apparatus for outputting power to a drive shaft, said power output apparatus comprising: an engine having an output shaft; power regulation means connected with said output shaft of said engine and said drive shaft for transmitting power output from said engine to said drive shaft and regulating magnitude of the transmitted power through transformation of electric power; a motor for receiving and transmitting power from and to said drive shaft; and memory means for storing a relationship between the revolving speed of said drive shaft, the power output from said engine, and a power state of said engine that enables said motor to be driven with a torque of not less than a predetermined torque, said method comprising the steps of:

(a) setting a revolving speed of said drive shaft and a torque output to said drive shaft as a target power state of said drive shaft;

(b) setting the power state of said engine obtained by referring to the relationship stored in said memory means as a target power state of said engine, based on a power to be output from said engine, which is set based on the target power state of said drive shaft, and an input revolving speed of said drive shaft; and (c) controlling said engine to be driven in the target power state of said engine, and controlling said motor and said power regulation means, so as to enable the power state of said engine to be converted to the target power state of said drive shaft and output to said drive shaft.

\* \* \* \* \*